(12) United States Patent
Mitsui et al.

(10) Patent No.: US 10,082,629 B2
(45) Date of Patent: Sep. 25, 2018

(54) OPTICAL COUPLING MEMBER, OPTICAL CONNECTOR AND ELECTRIC CONNECTOR

(71) Applicant: MITSUBISHI PENCIL COMPANY, LIMITED, Tokyo (JP)

(72) Inventors: Akihito Mitsui, Yokohama (JP); Naohiko Moriya, Yokohama (JP)

(73) Assignee: MITSUBISHI PENCIL COMPANY, LIMITED, Tokyo (JP)

(*) Notice: Subject to any disclaimer, the term of this patent is extended or adjusted under 35 U.S.C. 154(b) by 0 days.

(21) Appl. No.: 15/517,253

(22) PCT Filed: Sep. 15, 2015

(86) PCT No.: PCT/JP2015/076151
§ 371 (c)(1),
(2) Date: Apr. 6, 2017

(87) PCT Pub. No.: WO2016/056359
PCT Pub. Date: Apr. 14, 2016

(65) Prior Publication Data
US 2017/0299816 A1    Oct. 19, 2017

(30) Foreign Application Priority Data

Oct. 7, 2014 (JP) ................................ 2014-206628
Feb. 27, 2015 (JP) ................................ 2015-039122

(51) Int. Cl.
*G02B 6/32* (2006.01)
*G02B 6/26* (2006.01)
(Continued)

(52) U.S. Cl.
CPC ............. *G02B 6/322* (2013.01); *G02B 6/262* (2013.01); *G02B 6/3616* (2013.01);
(Continued)

(58) Field of Classification Search
None
See application file for complete search history.

(56) References Cited

U.S. PATENT DOCUMENTS 4,641,915 A * 2/1987 Asakawa ............. G02B 6/3886
385/26
4,690,495 A * 9/1987 Giannini .................. G02B 6/32
385/57

(Continued)

FOREIGN PATENT DOCUMENTS

DE    2646010 A1    4/1978
GB    2020055 A    11/1979

(Continued)

OTHER PUBLICATIONS

International Search Report dated Dec. 15, 2015, issued in counterpart application No. PCT/JP2015/076151. (2 pages).

(Continued)

*Primary Examiner* — Chad H Smith
(74) *Attorney, Agent, or Firm* — Westerman, Hattori, Daniels & Adrian, LLP

(57) ABSTRACT

It is an object of the present invention to accurately maintain a positional relationship between a lens held in a holding member and an optical fiber without requiring any complicated operation. The invention includes a holder (11), at one end of which a housing section (11c) that houses a ball lens (12) is formed and at the other end of which an insertion hole (11a) for inserting an optical fiber (13) is formed, and a magnet (14) provided outside in a direction crossing a housing direction of the ball lens at the one end of the holder, in which the magnet generates an attracting force for aligning a center of the ball lens with a center of an optical element provided in a coupling target.

15 Claims, 21 Drawing Sheets

(51) Int. Cl.
G02B 6/42 (2006.01)
G02B 6/36 (2006.01)
G02B 6/38 (2006.01)

(52) U.S. Cl.
CPC ......... *G02B 6/3886* (2013.01); *G02B 6/4219* (2013.01); *G02B 6/4256* (2013.01)

(56) References Cited

U.S. PATENT DOCUMENTS

| | | | | |
|---|---|---|---|---|
| 4,844,582 A | * | 7/1989 | Giannini | ............ G02B 6/3817 385/57 |
| 2010/0080563 A1 | | 4/2010 | DiFonzo et al. | |
| 2014/0112627 A1 | | 4/2014 | Isenhour et al. | |

FOREIGN PATENT DOCUMENTS

| | | |
|---|---|---|
| JP | 53-148644 | 11/1978 |
| JP | 54-158243 A | 12/1979 |
| JP | 57-100407 A | 6/1982 |
| JP | S60-100710 U | 7/1985 |
| JP | 61-70817 A | 4/1986 |
| JP | 62-197108 U | 12/1987 |
| JP | 2012-504312 A | 2/2012 |
| WO | 2012/029442 A1 | 3/2012 |

OTHER PUBLICATIONS

Extended (Supplementary) European Search Report dated May 28, 2018, issued in counterpart application No. 15848603.5. (9 pages).

* cited by examiner

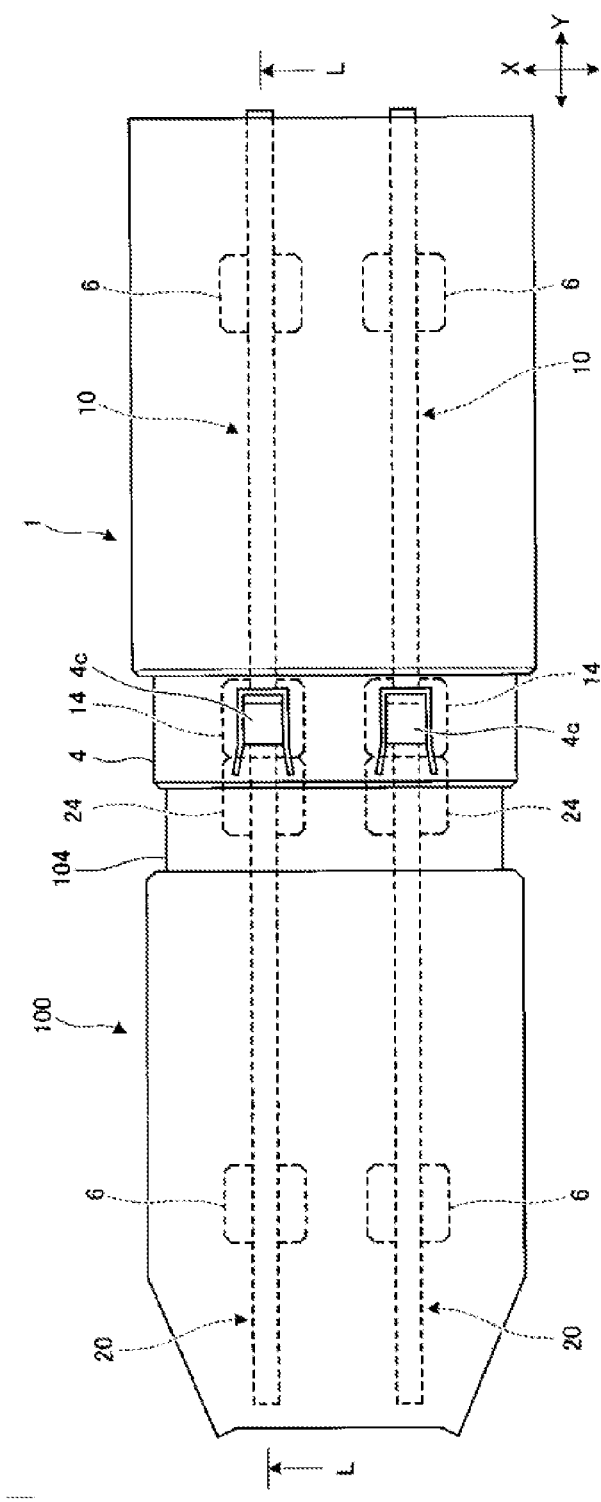
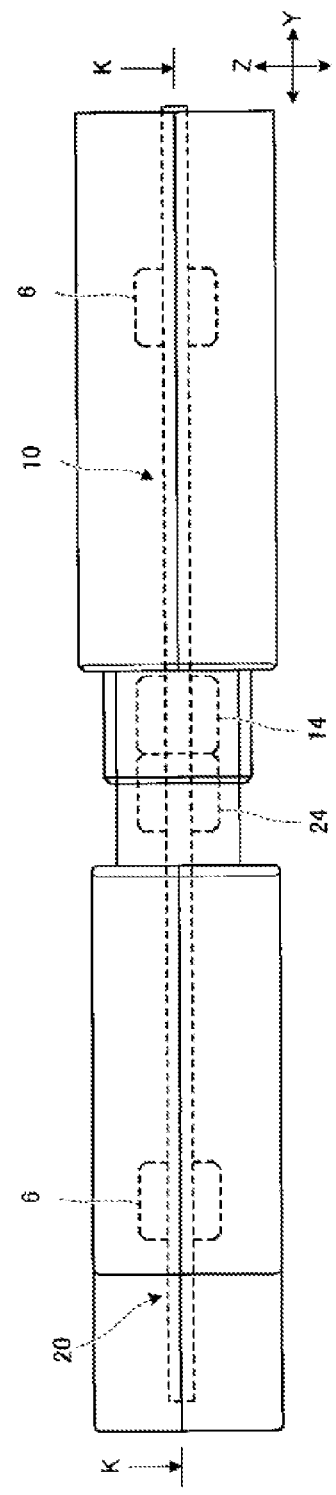
FIG. 17A
FIG. 17B

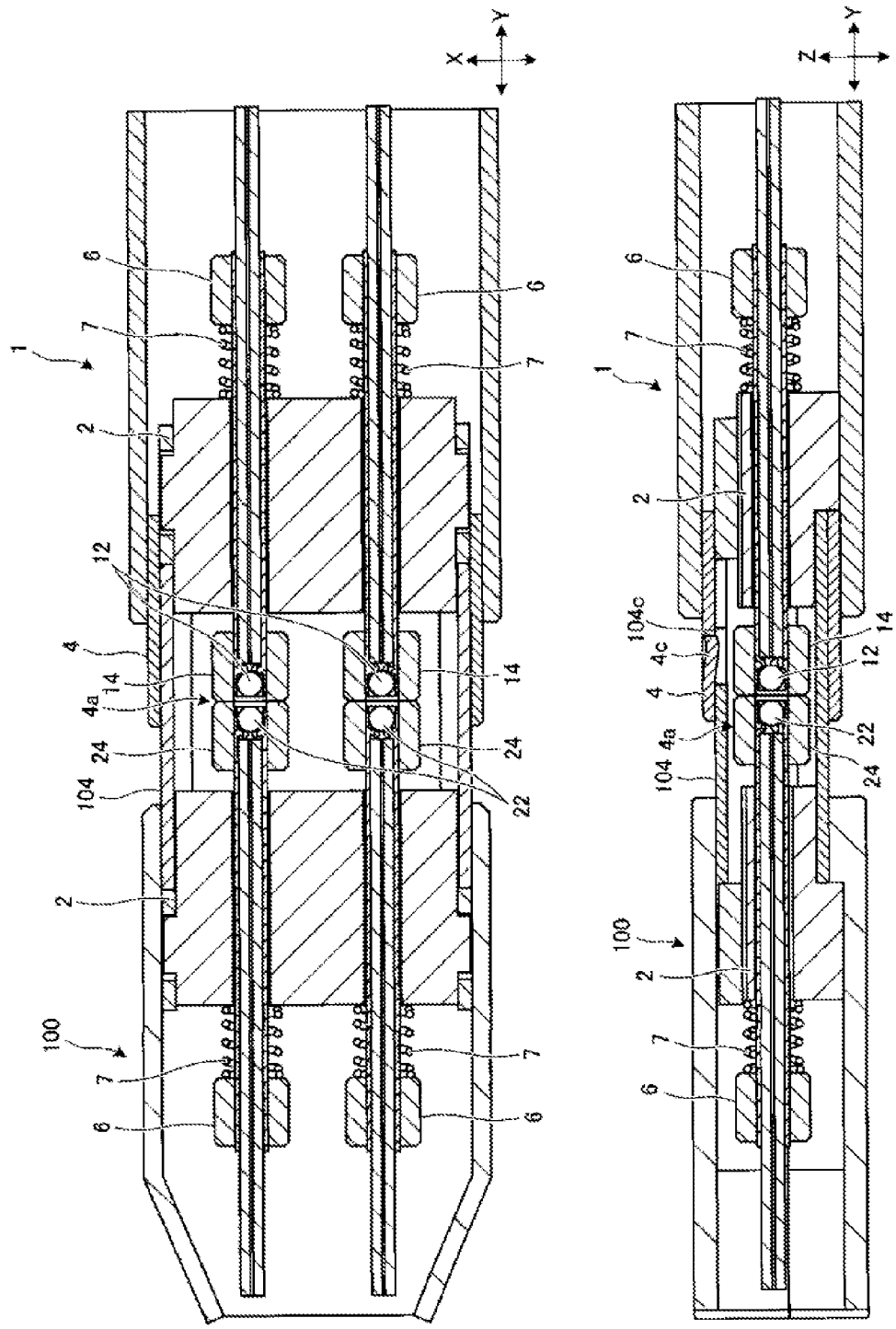

OPTICAL COUPLING MEMBER, OPTICAL CONNECTOR AND ELECTRIC CONNECTOR

TECHNICAL FIELD

The present invention relates to an optical coupling member used to condense light from a light-emitting device and enter the light to an optical fiber or condense light emitted from the optical fiber to a light-receiving device, and an optical connector and an electric connector provided with the optical coupling member.

BACKGROUND ART

An optical coupling member is used to cause light emitted from a light source to propagate through an optical fiber, to emit the light to the air as needed or to enter light propagating through the air into an optical fiber. As an aspect of such an optical coupling member, for example, an optical connector is being proposed which is provided with a socket that attaches an optical lens and a cylindrical magnet to a socket body into which an end portion of an optical fiber is fitted and a plug that attaches a cylindrical magnet to a plug body into which an end portion of an optical fiber is fitted (e.g., see Patent Literature 1). According to this optical connector, it is possible to always cause an end face of the optical fiber to abut on a spherical surface of the optical lens, couple the socket and the plug through an attracting force of the magnet, and thereby secure high transmission efficiency even when the end face of the optical fiber is not a completely flat surface.

CITATION LIST

Patent Literature

Patent Literature 1
Japanese Utility Model (Registration) Application Laid-Open No. 61-70817

SUMMARY OF INVENTION

Technical Problem

However, in the aforementioned conventional optical connector, the magnet attached to the socket is disposed inside a hole formed on the plug side, and on the other hand, the magnet attached to the plug is disposed around an insertion shaft provided on the socket side. When the plug is coupled with the socket, it is necessary to insert the magnet on the plug side into a cylindrical wall part that defines the hole formed in the socket and insert the insertion shaft that protrudes from the magnet toward the socket side inside the magnet on the socket side. This requires an operation of inserting the plug into the socket, resulting in a problem of complicating the coupling operation of the optical connector.

The present invention has been implemented in view of the above-described problem, and it is an object of the present invention to provide an optical coupling member, an optical connector and an electric connector capable of improving propagation efficiency of light in an optical fiber without requiring any complicate coupling operation.

Solution to Problem

An optical coupling member according to the present invention includes a holding member, at one end of which a housing section that houses a lens is formed and at the other end of which an insertion hole for inserting an optical fiber is formed, and an attracting member provided outside in a direction crossing a housing direction of the lens at the one end of the holding member, in which the attracting member generates an attracting force for aligning a center of the lens with a center of an optical element provided in a coupling target.

For example, in the optical coupling member, the attracting member is composed of a magnet. In the optical coupling member, a shape of a cross section of the magnet in a direction crossing the lens housing direction is preferably identical to a shape of a cross section of the magnet on the coupling target side disposed around the optical element.

For example, in the optical coupling member, an outside shape of a cross section of the magnet in a direction crossing the lens housing direction is a true circle shape having the center of the lens as a central point.

Furthermore, in the above-described optical coupling member, the cross section of the attracting member on the coupling target side is preferably disposed at the same position as the end portion of the lens on the coupling target side.

In the above-described optical coupling member, the cross section of the attracting member on the coupling target side may be disposed closer to the coupling target side than the end portion of the lens on the coupling target side.

The above-described optical coupling member is preferably further provided with a guide member that guides the coupling target toward the cross section side in a direction crossing the lens housing direction in the attracting member.

The above-described optical coupling member is preferably further provided with a fixing member that fixes the attracting member coupled with the coupling target.

An optical connector according to the present invention is provided with any one of the above-described optical coupling members. In the above-described optical connector, it is preferable to include a movement restricting member that restricts movement of the optical coupling member while allowing an operation of alignment of the optical coupling member with the coupling target.

In the above-described optical connector, the movement restricting member preferably includes a guide groove provided from one end to the other end which is the lens housing direction, and in the optical coupling member, the holding member is disposed in the guide groove with the attracting member protruding from one end side of the movement restricting member, a clearance is preferably provided between the holding member and the guide groove, and the attracting member is preferably allowed to perform the alignment operation on one end side of the movement restricting member. To be more specific, the width and height of the guide groove are preferably greater than the width and height of the optical coupling member of the portion disposed in the guide groove and smaller than at least one of the width and height of the optical coupling member at the position at which the attracting member is disposed.

In the above-described optical connector, a plurality of optical coupling members are preferably provided and the guide groove is preferably provided individually for each optical coupling member.

The above-described optical connector is preferably provided with an urging member that urges the attracting member toward one end face side of the movement restricting member, and an urging force of the urging member is preferably weaker than the attracting force with respect to the coupling target in the attracting member.

In the above-described optical connector, the urging member is an elastic body that connects the movement restricting member and the optical coupling member, and the attracting member is urged toward one end face side of the movement restricting member by an elastic force of the elastic body.

In the above-described optical connector, the elastic body preferably connects the movement restricting member and the optical coupling member on the other end side facing the movement restricting member.

In the above-described optical connector, the urging member includes a first attracting section provided in the optical coupling member on the other end side of the movement restricting member and a second attracting section that faces the first attracting section and is fixed on a housing side, and the attracting member is urged toward one end face side of the movement restricting member by an attraction between the first attracting section and the second attracting section.

An electric connector according to the present invention is provided with any one of the optical coupling members described above and a contact terminal for transmitting an electric signal.

Advantageous Effects of Invention

According to the present invention, it is possible to improve propagation efficiency of light in an optical fiber without requiring any complicated coupling operation.

BRIEF DESCRIPTION OF DRAWINGS

FIG. 17A is a plan view illustrating a state in which the optical connector (female type) shown in FIG. 13A and the optical connector (male type) shown in FIG. 15A are connected together and FIG. 17B is a side view illustrating a state in which the optical connector (female type) shown in FIG. 13B and the optical connector (male type) shown in FIG. 15B are connected together;

FIG. 18A is a cross-sectional view seen from an arrow direction of a line K-K shown in FIG. 17B and FIG. 18B is a longitudinal cross-sectional view seen from an arrow direction of a line L-L shown in FIG. 17A;

DESCRIPTION OF EMBODIMENTS

Hereinafter, an embodiment of the present invention will be described in detail with reference to the accompanying drawings. A case will be described below as an example where an optical fiber held by an optical coupling member according to the present invention is formed of a plastic optical fiber. However, the optical fiber held by the optical coupling member according to the present invention is not limited to this, but may also be formed of a glass fiber.

(Optical Coupling Member)

Figure 1:
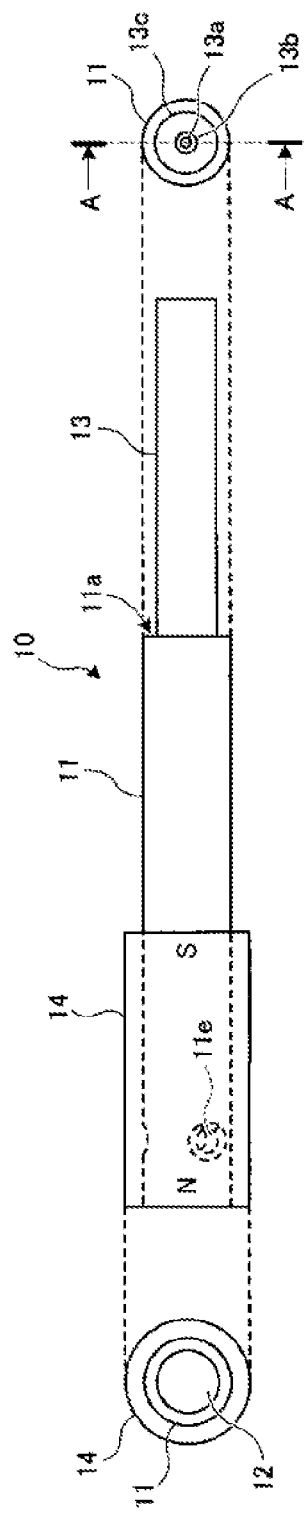
FIG. 1 is a diagram illustrating an optical coupling member according to an embodiment.
Figure 2:
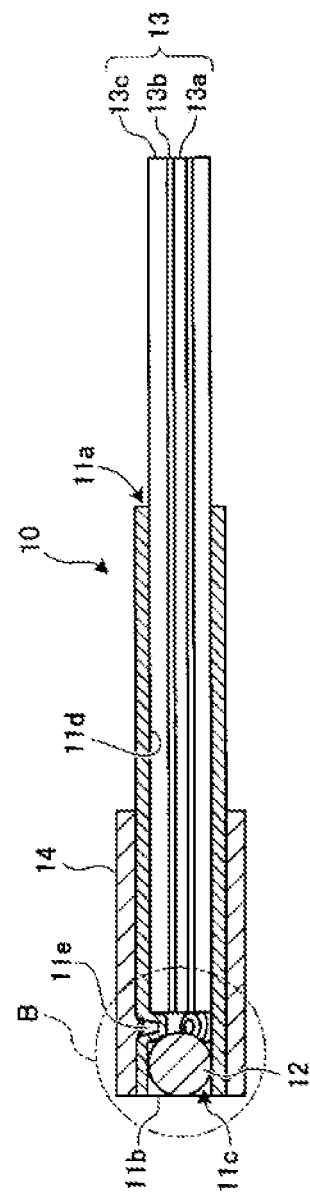
FIG. 2 is a cross-sectional view seen from an arrow direction of a line A-A shown in FIG. 1.

FIG. 1 is a diagram illustrating an optical coupling member according to the present embodiment. FIG. 2 is a cross-sectional view seen from an arrow direction of a line A-A shown in FIG. 1. Note that in an optical coupling member 10 shown in FIG. 1 and FIG. 2, the left side shown in the figures is called a "front side" and the right side is called a "rear side" for convenience of description. FIG. 1 and FIG. 2 illustrate an optical fiber 13 held in a holder 11 included in the optical coupling member 10 for convenience of description. Moreover, FIG. 1 illustrates part of the holder 11 disposed inside a magnet 14 using a broken line for convenience of description.

As shown in FIG. 1 and FIG. 2, the optical coupling member 10 according to the present embodiment is constructed of the holder 11 that generally has a cylindrical shape as a holding member, a ball lens 12 held at one end of the holder 11 and the magnet 14 provided on an outer circumference at one end of the holder 11 as an attracting member. For example, a plastic optical fiber is preferably inserted as the optical fiber 13 in the optical coupling member 10 according to the present embodiment.

The holder 11 is formed of a metallic material such as stainless steel. The holder 11 is preferably formed of austenite-based stainless steel from the standpoint of processability in particular. As shown in FIG. 2, an insertion hole 11a into which the optical fiber 13 is inserted is provided at a rear end portion of the holder 11. On the other hand, an opening 11b is provided at a front end portion of the holder 11 (end portion on a ball lens 12 side). A housing section 11c that houses the ball lens 12 is provided inside the opening 11b. This housing section 11c is provided in such a size that the entire ball lens 12 can be housed inside to prevent damage to the surface of the ball lens 12 and configured so that the ball lens 12 can be press-fitted.

A through hole 11d having a diameter slightly greater than an outer diameter of the optical fiber 13 is provided inside the holder 11. This through hole 11d is provided so as to communicate with the insertion hole 11a and communicate with the housing section 11c. The holder 11 is further provided with a plurality of recessed parts 11e formed by applying pressing from its outer circumferential portion using a tool or the like. These recessed parts 11e are provided between the housing section 11c and the through hole 11d and used for alignment between the ball lens 12 and the optical fiber 13, details of which will be described later.

The ball lens 12 is formed of a glass material and has a spherical shape. As shown in FIG. 2, the ball lens 12 is housed in the housing section 11c so that its front end portion is disposed at the same position as the front end portion of the holder 11. When housed in the housing section 11c, the ball lens 12 is disposed so as to face the distal end portion of the optical fiber 13 inserted into the through hole 11d. That is, when positioned on an inner wall surface formed by providing the recessed parts 11e in the holder 11, the ball lens 12 and the optical fiber 13 are positioned at positions having a certain positional relationship. In this case, the ball lens 12 is disposed opposite to the distal end face (front end face) of the optical fiber 13. The ball lens 12 can be made up of a collimating lens that adjusts light entering from the optical fiber 13 into a parallel form.

The optical fiber 13 is constructed of a core 13a provided by penetrating the center of the optical fiber 13, a clad 13b that covers this core 13a and a reinforcement layer 13c that covers and reinforces the clad 13b. The core 13a, clad 13b and reinforcement layer 13c are arranged on the same flat surface on an end face facing the ball lens 12 of the optical fiber 13. That is, the core 13a, clad 13b and reinforcement layer 13c are arranged uniformly on the end face facing the ball lens 12.

The optical fiber 13 is inserted into the through hole 11d via the insertion hole 11a and fixed by being disposed so that its distal end portion faces the spherical surface of the ball lens 12 in the vicinity thereof. For example, the optical fiber 13 is fixed by an adhesive applied to the inner circumferential surface of the holder 11. Note that the optical fiber 13 may also be fixed by deforming part of the holder 11.

In the optical coupling member 10 according to the present embodiment, the optical fiber 13 is composed of, for example, a graded index (GI) type optical fiber and configured so that its refractive index changes continuously on a cross section perpendicular to the fiber axis. Furthermore, the core 13a and the clad 13b are formed of fully fluorine-substituted optical resin obtained by substituting H by F of C—H coupling. By forming the optical fiber 13 of fully fluorine-substituted optical resin as well as a GI type optical fiber, it is possible to achieve high speed, large capacity communication.

In the optical coupling member 10, the recessed parts 11e provided in the holder 11 are used to position the ball lens 12 and the optical fiber 13 in a simple manner while suppressing cost increases. To be more specific, by causing the ball lens 12 and part of the optical fiber 13 to abut on an abutting surface (inclined surface) formed by providing the recessed parts 11e in the holder 11 to thereby position them, it is possible to eliminate the necessity for a configuration such as a positioning spacer and simply position the ball lens 12 and the optical fiber 13 while suppressing cost increases.

Figure 3:
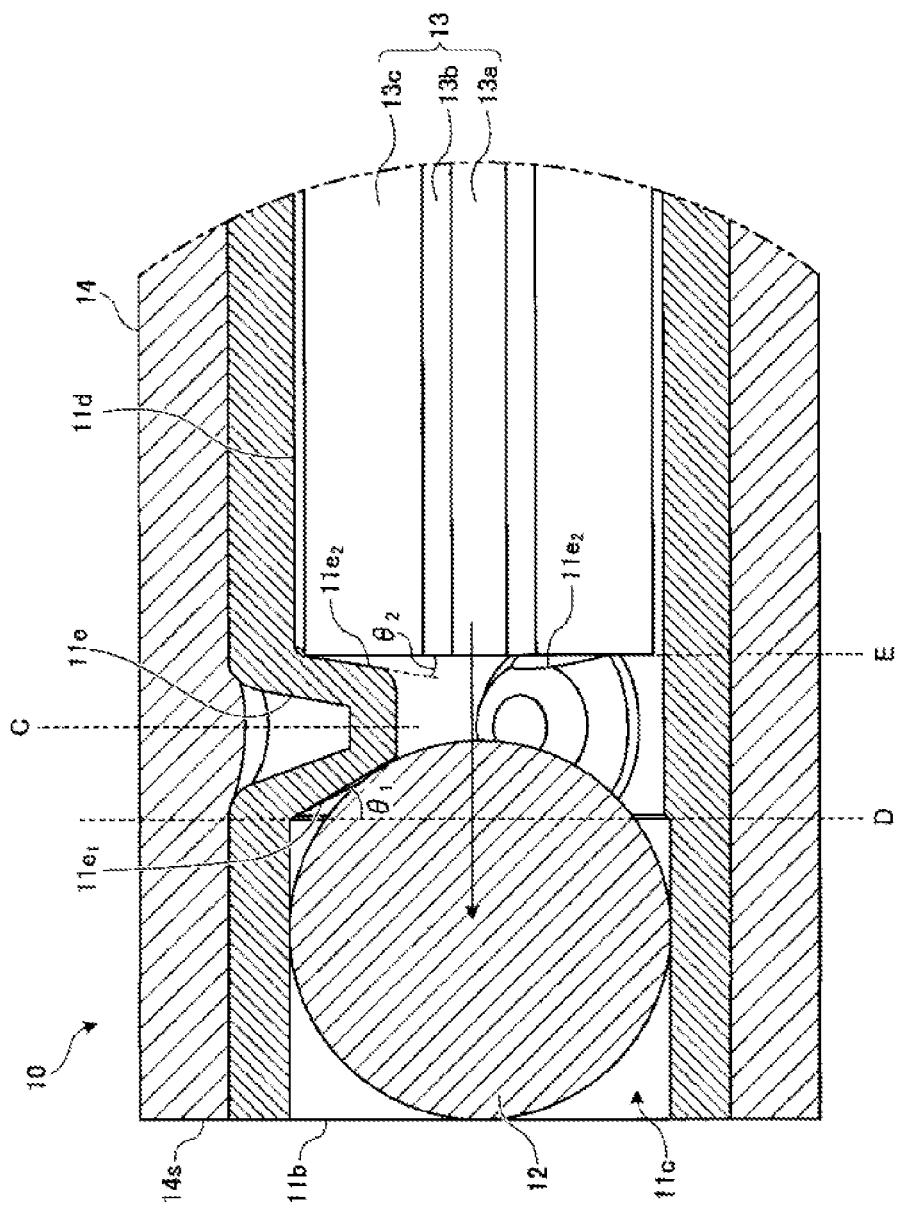
FIG. 3 is an enlarged view of a part enclosed by a two-dot dashed line B shown in FIG. 2.

Here, a method for positioning the ball lens 12 and the optical fiber 13 in the holder 11 will be described using FIG. 3. FIG. 3 is an enlarged view of the part encircled by a two-dot dashed line B shown in FIG. 2. As shown in FIG. 3, of the inclined surfaces formed by providing the recessed parts 11e, the portion facing the ball lens 12 is in contact with part of the ball lens 12 and the portion facing the optical fiber 13 is in contact with the clad 13b or the reinforcement layer 13c other than the core 13a making up the optical fiber 13 or part of the clad 13b and the reinforcement layer 13c. In such a contacting state, the ball lens 12 and optical fiber 13 are positioned at predetermined positions of the holder 11 respectively.

As shown in FIG. 3, the recessed part 11e is provided in such a way that an angle formed by the portion facing the ball lens 12 with respect to a plane orthogonal to the insertion direction of the optical fiber 13 (e.g., a plane C disposed parallel to the end face of the optical fiber 13 shown in FIG. 3 and passing through the center of the recessed part 11e) is different from an angle formed by the portion facing the optical fiber 13. Such a recessed part 11e is provided by applying pressing using pointed tools having different distal end portion shapes. By being pressed using such tools, the recessed part 11e is caused to have the angle formed of the portion facing the ball lens 12 which is different from the angle formed of the portion facing the optical fiber 13 on the basis of the central axis during the pressing, and it is thereby possible to effectively position the ball lens 12 and the optical fiber 13 having different shapes.

The holder 11 is provided with a plurality of (three in the present embodiment) such recessed parts 11e on the same circumference of the holder 11. The recessed parts 11e may be formed on the same circumference by simultaneously applying pressing from the outer circumference of the holder 11 using the aforementioned tools having different distal end shapes. Thus, by providing a plurality of recessed parts 11e on the same circumference, it is possible to cause the ball lens 12 and the optical fiber 13 to contact each other at a plurality of positions respectively, and thereby position the ball lens 12 and the optical fiber 13 with high accuracy.

The portion of the recessed part 11e facing the ball lens 12 constitutes an inclined surface $11e_1$. The inclined surface $11e_1$ is provided so that an angle $\theta_1$ with respect to a plane orthogonal to the insertion direction of the optical fiber 13 shown by an arrow in FIG. 3 (e.g., a plane D disposed parallel to the end face of the optical fiber 13 shown in FIG. 3 and passing through the proximal end portion of the recessed part 11e) becomes 0° or above and 45° or below. Thus, by setting the angle $\theta_1$ of the inclined surface $11e_1$ on the ball lens 12 side to 0° or above and 45° or below with respect to the plane D orthogonal to the insertion direction of the optical fiber 13, it is possible to perform positioning while supporting part of the ball lens 12 on the optical fiber 13 side, and thereby increase positional accuracy of the ball lens 12.

On the other hand, the portion of the recessed part 11e facing the optical fiber 13 constitutes an inclined surface 11e$_2$. The inclined surface 11e$_2$ is provided so that an angle θ$_2$ with respect to a plane orthogonal to the insertion direction of the optical fiber 13 (e.g., a plane E disposed parallel to the end face of the optical fiber 13 shown in FIG. 3) becomes 20° or below. Thus, by providing the inclined surface 11e$_2$ so that the angle of the inclined surface 11e$_2$ becomes 20° or below with respect to the plane E, the end face of the optical fiber 13 is caused to contact the recessed part 11e in the case where the optical fiber 13 is formed of an optical fiber in which the core 13a, clad 13b and reinforcement layer 13c are arranged on the same plane, and it is thereby possible to easily secure the positional accuracy.

Thus, in the optical coupling member 10, the ball lens 12 and the optical fiber 13 are positioned by causing part of the ball lens 12 and part of the optical fiber 13 to contact the recessed part 11e provided in the holder 11, and it is thereby possible to position the ball lens 12 and the optical fiber 13 using the recessed part 11e as a reference, making it possible to improve operation efficiency compared to a case where another part is inserted into the holder 11, and simply position the ball lens 12 and the optical fiber 13 while suppressing cost increases.

The magnet 14 is provided around the outer perimeter of the front end portion of the holder 11 (end portion on the ball lens 12 side). For example, the magnet 14 generally has a cylindrical shape. The magnet 14 is fixed to the holder 11 with part of the holder 11 being housed therein. For example, the magnet 14 is fixed using, for example, an adhesive applied to the outer circumferential surface of the holder 11. Note that the magnet 14 may also be fixed to the outer circumferential surface of the holder 11 through welding or the like.

As shown in FIG. 3, the front end portion of the magnet 14 has a planar cross section 14s. The cross section 14s of the front end portion of the magnet 14 is fixed to the holder 11 so as to be disposed at the same position as that of the front end portion of the holder 11. As described above, the front end portion of the ball lens 12 housed in the housing section 11c is disposed at the same position as that of the front end portion of the holder 11. Therefore, the cross section 14s of the front end portion of the magnet 14 is disposed at the same position as that of the front end portion of the all lens 12.

As shown in FIG. 1, the vicinity of the front end portion of the magnet 14 is magnetized to an N-pole and the vicinity of the rear end portion is magnetized to an S-pole. Though details will be described later, the magnet 14 and a magnet 24 of an optical coupling member 20 which is a coupling target attract each other, the magnet 14 plays a role of aligning the center of the ball lens 12 with the center of the ball lens 22 of the optical coupling member 20 (see FIGS. 4A, 4B and 4B).

Figure 4A:
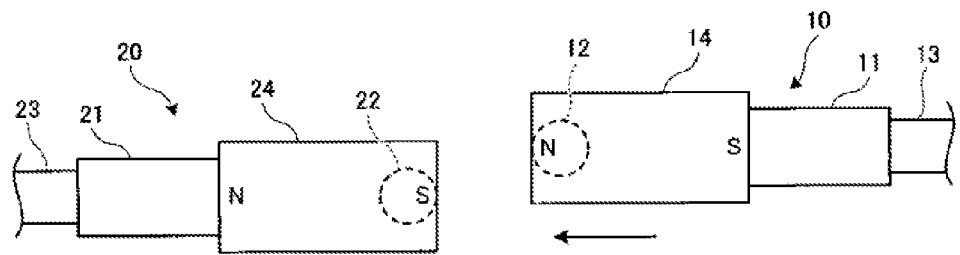
FIGS. 4A, 4B and 4C are a diagram illustrating a coupling operation of an optical coupling member according to the present embodiment.
Figure 4B:
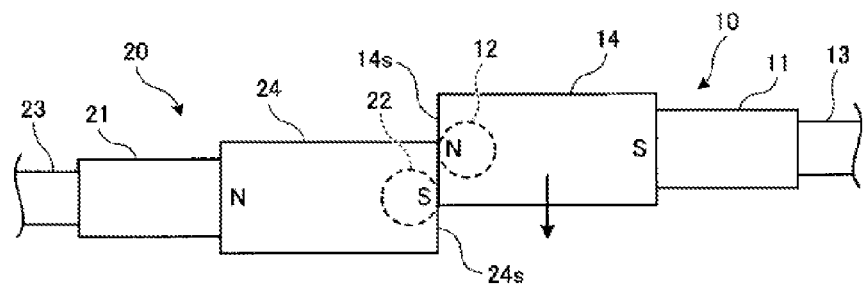
Figure 4C:
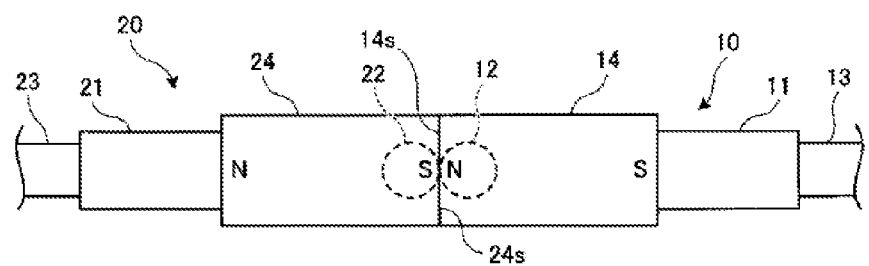

Hereinafter, a coupling operation of the optical coupling member 10 according to the present embodiment will be described. FIGS. 4A, 4B and 4C are a diagram illustrating a coupling operation of the optical coupling member 10 according to the present embodiment. In FIGS. 4A, 4B and 4C, a case will be described where the optical coupling member 10 according to the present embodiment is coupled with the optical coupling member 20 as a coupling target which has a configuration similar to that of the optical coupling member 10. FIGS. 4A, 4B and 4C illustrate an optical fiber 23 which is held in a holder 21 included in the optical coupling member 20, for convenience of description.

As shown in FIGS. 4A, 4B and 4C, the optical coupling member 20 includes the holder 21, a ball lens 22 and a magnet 24 as in the case of the optical coupling member 10. The optical coupling member 20 is different from the optical coupling member 10 only in a magnetization mode of the magnet 24. In the optical coupling member 20, in the magnet 24, unlike the magnet 14, the vicinity of the distal end portion on the ball lens 22 side is magnetized to an S-pole and the vicinity of the other end on the opposite side is magnetized to an N-pole. Positioning of the ball lens 22 and the optical fiber 23, and positional relationships between the ball lens 22, holder 21 and magnet 24 or the like are identical to those of the optical coupling member 10.

A case will be described here where the position of the optical coupling member 20 is fixed to a device or the like and the optical coupling member 10 is coupled with this optical coupling member 20. When the optical coupling member 10 is coupled with the optical coupling member 20, an operator or the like causes the magnet 14 to come closer to the vicinity of the magnet 24 as shown in FIG. 4A. When the magnet 14 is caused to approach within a certain distance from the magnet 24, the magnet 14 is attracted to the magnet 24 side by an attracting force between the two magnets. This causes the magnet 24 and the magnet 14 to remain in contact with each other (see FIG. 4B).

The magnet 14 further moves from a state shown in FIG. 4B by the attracting force between the magnet 24 and the magnet 14 so that the cross section 24s of the magnet 24 on the optical coupling member 10 side and the cross section 14s of the magnet 14 on the optical coupling member 20 side are arranged facing each other. Here, the magnet 14 moves downward. This causes the cross section 24s of the magnet 24 on the optical coupling member 10 side and the cross section 14s of the magnet 14 on the optical coupling member 20 side to remain in close contact with each other as shown in FIG. 4C.

The optical coupling member 10 and the optical coupling member 20 have the same positional relationship between their respective components. For this reason, when the cross section 24s of the magnet 24 on the optical coupling member 10 side and the cross section 14s of the magnet 14 on the optical coupling member 20 side are in close contact with each other, the center of the ball lens 12 coincides with the center of the ball lens 22.

In the optical coupling member 10, since the attracting force of the magnet 14 provided in the holder 11 causes the center of the ball lens 12 to align with the center of the ball lens 22 of the optical coupling member 20, alignment between the ball lens 12 and the ball lens 22 can be easily achieved by only causing the holder 11 to approach the optical coupling member 20. This makes it possible to improve propagation efficiency of light in the optical fiber 13 without requiring any complicated coupling operation.

Particularly, in the optical coupling member 10 according to the present embodiment, the attracting force from the magnet 14 causes the center of the ball lens 12 to align with the center of the ball lens 22 of the optical coupling member 20. This allows the optical coupling member 10 to easily attach/detach to/from the optical coupling member 20 and repeat attachment/detachment for a long period of time.

The magnet 14 is configured such that the cross section 14s on the optical coupling member 20 side has the same shape as the shape of the cross section 24s of the magnet 24. Thus, the attracting force between the magnets 14 and 24 allows the cross sections 14s and 24s to come into close contact with each other. This makes it possible to stably couple the optical coupling member 10 with the optical coupling member 20.

In the magnet 14 in particular, the outside shape of the cross section 14s on the optical coupling member 20 side is shaped like a perfect circle, a center of which corresponds to the center of the ball lens 12. This prevents the magnet 14 from rotating when it is attracted to the magnet 24 of the optical coupling member 20. Thus, it is possible to prevent the holder 11 in which the magnet 14 is provided from rotating and thereby prevent the optical fiber 13 held in the holder 11 from twisting.

Furthermore, the cross section 14s of the magnet 14 on the optical coupling member 20 side is disposed at the same position as that of the front end portion of the ball lens 12 (end portion on the optical coupling member 20 side). It is thereby possible to shorten the distance between the ball lens 12 and the ball lens 22 of the optical coupling member 20 and it is possible to prevent propagation efficiency of light in the optical fiber 13 from deteriorating as the distance between the ball lenses 12 and 22 increases.

A case has been described regarding the optical coupling member 10 according to the above embodiment where the cross section 14s of the magnet 14 on the optical coupling member 20 side is disposed at the same position as the front end portion of the ball lens 12 (end portion on the optical coupling member 20 side). However, the configuration of the magnet 14 is not limited to this, but can be modified as appropriate. Hereinafter, different configurations of the magnet 14 will be described with reference to FIGS. 5A and 5B.

Figure 5A:
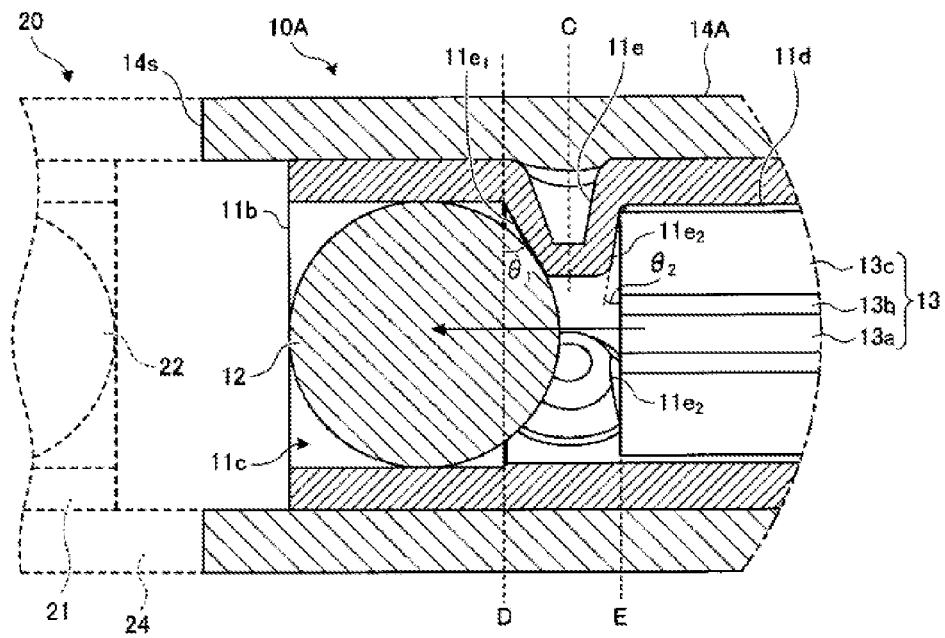
FIGS. 5A and 5B are a diagram illustrating an optical coupling member according to a modification example of the present embodiment.
Figure 5B:
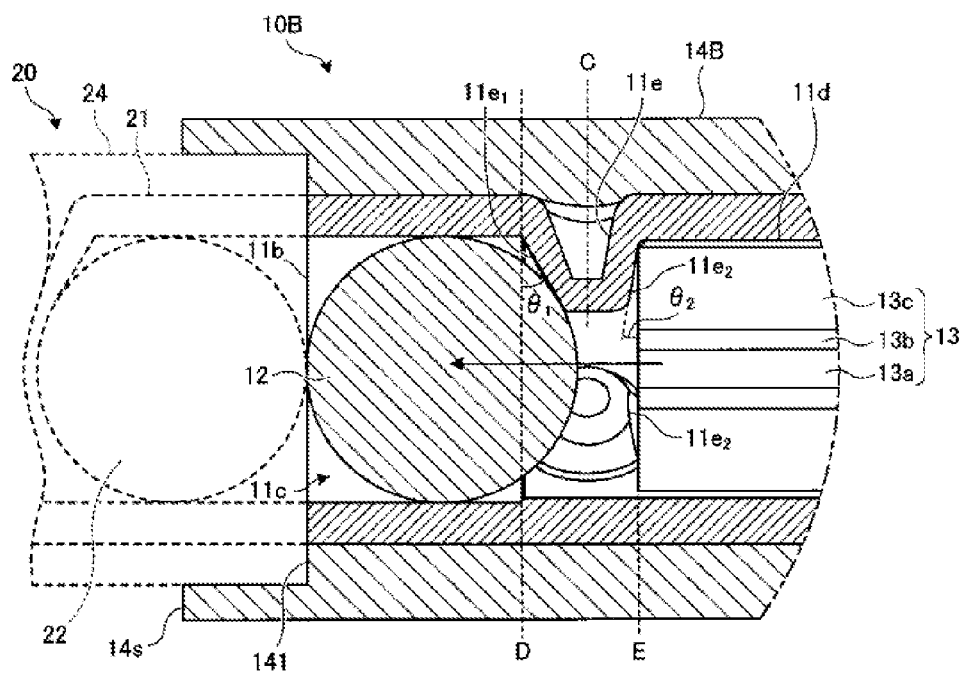

FIGS. 5A and 5B are a diagram illustrating an optical coupling member 10 (10A, 10B) according to a modification example of the present embodiment. The optical coupling members 10A and 10B illustrated in FIG. 5A and FIG. 5B respectively, are different from the optical coupling member 10 according to the above embodiment only in that the magnets 14A and 14B have different configurations from that of the magnet 14. Note that in FIGS. 5A and 5B, component common to those in FIG. 3 are assigned identical reference numerals and description thereof will be omitted.

For convenience of description, FIGS. 5A and 5B illustrate a state in which the optical coupling member 10A or 10B is coupled with the optical coupling member 20 which is a coupling target. In this case, suppose the optical coupling member 20 coupled with the optical coupling member 10A has a configuration similar to that of the optical coupling member 10A. Furthermore, suppose the optical coupling member 20 coupled with the optical coupling member 10B has a configuration similar to that of the optical coupling member 20 described in the above embodiment.

In the optical coupling member 10A shown in FIG. 5A, the magnet 14A is different from the magnet 14 according to the above embodiment in that its cross section 14s on the optical coupling member 20 side is disposed at a position closer to the optical coupling member 20 side than the front end portion of the ball lens 12 (end portion on the optical coupling member 20 side). When such a modification is made, since the cross section 14s of the magnet 14A is disposed closer to the optical coupling member 20 than the ball lens 12, it is possible to prevent situations in which the surface of the ball lens 12 is damaged due to unintentional contact or the like. Note that even in the case where the cross section 14s of the magnet 14A is disposed closer to the optical coupling member 20 than the ball lens 12, the distance between the ball lens 12 and the ball lens 22 is preferably 1 mm or less.

In the optical coupling member 10B shown in FIG. 5B the magnet 14B is different from the magnet 14 according to the above embodiment in that the magnet 14B includes a concave part 141 that can house the distal end portion of the optical coupling member 20 at the front end portion on the optical coupling member 20 side. When such a modification is made, since the concave part 141 can house the distal end portion of the optical coupling member 20, after the optical coupling member 10B is coupled with the optical coupling member 20, it is possible to prevent situations in which the optical coupling member 20 may come off due to an external force or the like.

Note that regarding the optical coupling member 10 according to the above embodiment, a case has been described where the optical coupling member 10 and the optical coupling member 20 are coupled together by an attracting force generated by the magnets 14 and 24. However, the configuration of the optical coupling member 10 is not limited to this. It is preferable for the embodiment to strengthen or facilitate the coupling between the coupling member 10 and the optical coupling member 20.

Figure 6A:
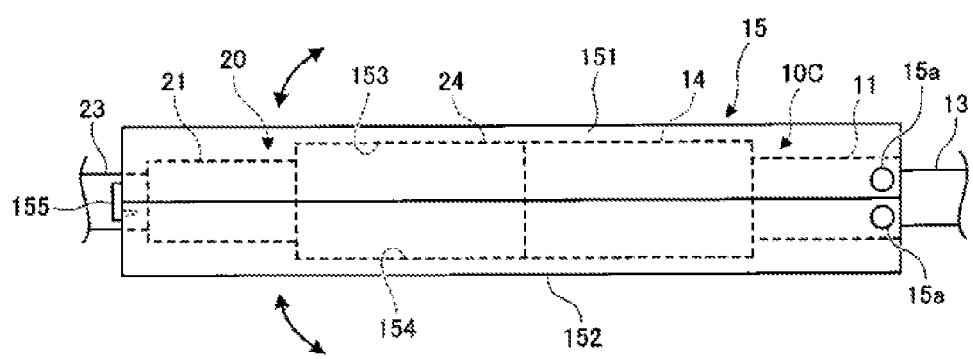
FIGS. 6A and 6B are a diagram illustrating an optical coupling member according to a modification example of the present embodiment.
Figure 6B:
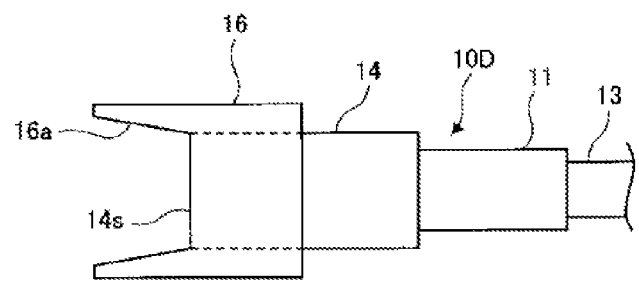

FIGS. 6A and 6B are a diagram illustrating an optical coupling member 10 (10C, 10D) according to a modification example of the present embodiment. Note that in FIG. 6A and FIG. 6B, parts of the optical coupling members 10C, 10D, 20 and optical fibers 13 and 23 arranged in a fixing member 15 and a guide member 16 are shown by broken lines for convenience of description.

The optical coupling member 10C shown in FIG. 6A is different from the optical coupling member 10 according to the above embodiment in that it is provided with the fixing member 15 that fixes the magnets 14 and 24 coupled with the optical coupling member 20. The optical coupling member 10D shown in FIG. 6B is different from the optical coupling member 10 according to the above embodiment in that it includes the guide member 16 that guides the optical coupling member 20 to the cross section 14s side of the magnet 14.

The optical coupling member 10C shown in FIG. 6A is different from the optical coupling member 10 in that it includes a pair of upper and lower fixing members 15 (151, 152), a front side (left side shown in FIGS. 6A and 6B) part of which is configured to be rotatable around a pair of shafts 15a provided in the vicinity of a rear end portion of the holder 11 (right side end portion shown in FIG. 6). These fixing members 15 (151, 152) are molded of, for example, an insulating resin material.

Of these fixing members 15, a concave part 153 which is open downward is formed in an undersurface of the fixing member 151 disposed on an upper side. On the other hand, a concave part 154 which is open upward in a top surface of the fixing member 152 disposed on a downward side. When the fixing members 15 (151, 152) are closed, the concave parts 153 and 154 have a shape capable of housing the holders 11 and 21 and the magnets 14 and 24 of the coupled optical coupling members 10 and 20.

A hook 155 to be locked to the fixing member 152 is provided at a front end portion of the fixing member 151. When the components of the coupled optical coupling members 10C and 20 are housed in the concave parts 153 and 154 in the fixing members 151 and 152, and the hook 155 of the fixing member 151 is locked to the fixing member 152, the mutually attracting magnets 14 and 24 are fixed, and it is thereby possible to prevent the positions of the optical coupling members 10C and 20 from shifting. This makes it possible to prevent deterioration of propagation efficiency of light in the optical fibers 13 and 23 caused by positional shifts.

Note that a case has been described in FIG. 6A where the fixing member 15 fixes the holders 11 and 21, and the magnets 14 and 24 of the coupled optical coupling members 10 and 20. However, the configuration of the fixing member 15 is not limited to this, but the configuration can be changed as appropriate. An arbitrary configuration can be adopted for the fixing member 15 on the assumption that the mutually attracting magnets 14 and 24 are fixed.

The optical coupling member 10D shown in FIG. 6B is different from the optical coupling member 10 in that the guide member 16 is attached to the outer circumferential portion in the vicinity of the front end portion of the magnet 14 (the left side end portion shown in FIGS. 6A and 6B). This guide member 16 is molded, for example, of an insulating resin material. The guide member 16 generally has a cylindrical shape and is fixed to the magnet 14 with part of the magnet 14 being housed therein. For example, the guide member 16 is fixed using an adhesive applied to the outer circumferential surface of the magnet 14.

The guide member 16 has a shape protruding toward the coupling target (e.g., optical coupling member 20) side more than the cross section 14s of the magnet 14. A tapered surface 16a is provided inside this protruding portion. The tapered surface 16a constitutes an inclined surface where the space in the guide member 16 expands from the cross section 14s of the magnet 14 toward the front side. In other words, the tapered surface 16a constitutes an inclined surface that guides the coupling target disposed inside or in the vicinity of the guide member 16 to the cross section 14s of the magnet 14.

When the optical coupling member 10D is caused to approach the optical coupling member 20 which is the coupling target according to the procedure shown in FIG. 4A, the optical coupling member 10D approaches the optical coupling member 20 so that the magnet 24 is housed in the guide member 16. In this case, the optical coupling member 10D approaches the optical coupling member 20 while guiding the magnet 24 along the tapered surface 16a of the guide member 16 and the magnet 14 is attracted to the magnet 24 on the optical coupling member 20 side. After the magnets 14 and 24 are brought into contact with each other, the cross sections 14s and 24s are brought into close contact with each other and the center of the ball lens 12 coincides with the center of the ball lens 22 (see FIG. 4C).

In this way, in the optical coupling member 10D shown in FIG. 6B, the guide member 16 guides the coupling target (e.g., optical coupling member 20) to the cross section 14s of the magnet 14, and thereby allows the coupling target to be attracted and brought into close contact with the magnet 14 along the guide member 16. This facilitates the coupling between the coupling target and the optical coupling member 10.

As described above, the optical coupling member 10 according to the present embodiment has a configuration including the holder 11, at the front end of which the housing section 11c that houses the ball lens 12 is formed and at the rear end of which the insertion hole 11a into which the optical fiber 13 is inserted is formed, and the magnet 14 provided outside in the direction crossing the housing direction (left-right direction shown in FIG. 1) of the ball lens 12 at the front end of the holder 11, in which the magnet 14 generates an attracting force for aligning the center of the ball lens 12 with the center of the optical element provided in the coupling target. According to this configuration, the attracting force of the magnet 14 provided in the holder 11 causes the center of the ball lens 12 to be aligned with the center of the optical element provided in the coupling target, and it is thereby possible to simply align the ball lens 12 with the optical element by only causing the holder 11 to approach the coupling target. This makes it possible to improve propagation efficiency of light in the optical fiber 13 without requiring any complicated coupling operation.

Particularly, the optical coupling member 10 according to the present embodiment in is provided with the ball lens 12 having a collimating function and can be coupled with the optical coupling member 20 provided with the ball lens 22 likewise including the collimating function. According to this configuration, it is possible to couple light propagating through the optical fiber 13 (23) without requiring exact alignment between the ball lenses 12 and 22. This eliminates the necessity for any complicated coupling operation of exact alignment between the ball lenses 12 and 22, and allows the optical coupling members 10 and 20 to be coupled only by the attracting force between the magnets 14 and 24.

Note that the present invention is not limited to the above-described embodiment, but can be implemented modified in various ways. In the above-described embodiment, the present invention is not limited to the sizes and shapes or the like illustrated in the accompanying drawings, but can be changed as appropriate within a range in which the effects of the present invention can be exhibited. In addition, the present invention can be implemented modified as appropriate without departing from the object of the present invention.

For example, a case has been described in the above embodiment where the lens provided for the optical coupling member 10 is made up of the ball lens 12. However, the lens applied to the optical coupling member 10 is not limited to the ball lens 12, but can be changed as appropriate. For example, an arbitrary lens such as a convex lens or a concave lens can be applied on the assumption that the lens can appropriately couple light propagating to/from the coupling target.

A case has been described in the above embodiment where the optical coupling member 10 is provided with the magnet 14 as an attracting member. However, the attracting member provided for the optical coupling member 10 is not limited to this, but can be changed as appropriate. The optical coupling member 10 may be provided with a magnetic body that is attracted to the magnet provided for the coupling target as the attracting member. Such a modification as in the case of the above embodiment can improve propagation efficiency of light in the optical fiber 13 without requiring any complicated coupling operation.

Furthermore, a case has been described in the above embodiment where the magnet 14 provided for the optical coupling member 10 has a cylindrical shape. However, the shape of the magnet 14 provided for the optical coupling member 10 is not limited to this, but may be changed as appropriate. An arbitrary shape can be adopted on the assumption that the center of the ball lens 12 can be aligned with the center of the optical element on the coupling target side in the relationship with the magnet provided for the coupling target. For example, the magnet 14 may be formed of a cylindrical body having a polygonal cross-sectional shape. The magnet 14 may be shaped not so as to surround the entire periphery of the front end portion of the holder 11 but so as to be arranged in part thereof. Furthermore, the magnet 14 may be configured so that the cross section of the front end portion thereof has not a flat shape but a concavo-convex shape.

Furthermore, a case has been described in the above embodiment where the optical coupling member 10 is coupled with the optical coupling member 20 having the same configuration as the coupling target therefor. However, the coupling target of the optical coupling member 10 is not limited to this, but can be changed as appropriate. For example, the optical coupling member 10 can be coupled with a coupling target not including any lens as an optical element, a coupling target provided with the magnet 24 having a different cross-sectional shape or a coupling target provided with a magnetic substance instead of the magnet 24.

(Connector)

The optical coupling member 10 according to the present embodiment described above together with the optical coupling member 20 having the same configuration as shown in FIGS. 4A, 4B and 4C can constitute an optical connector. In this case, the operator or the like performs a coupling operation of the optical coupling member 10 while holding the holder 11 or the like. That is, the optical coupling member 10 according to the present embodiment can constitute part of the optical connector. In this case, the optical connector can enjoy the effects obtained by any one of the aforementioned optical coupling members 10, and 10A to 10D.

Figure 7A:
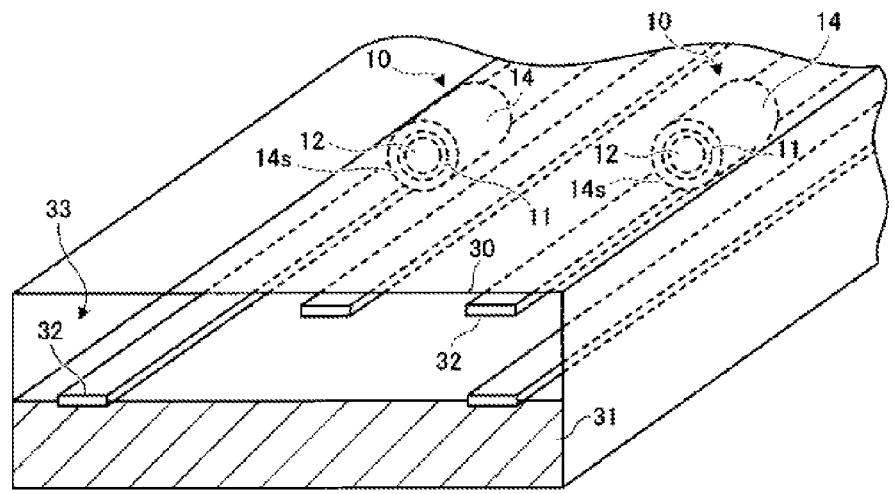
FIGS. 7A and 7B are a diagram illustrating an application example of the optical coupling member according to the present embodiment.
Figure 7B:
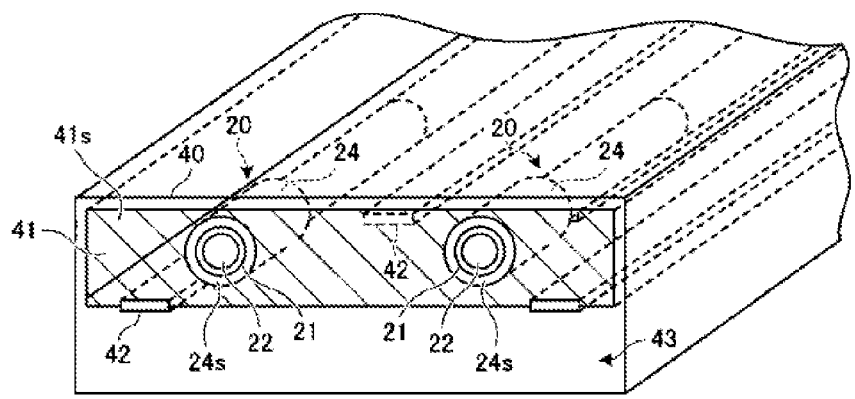
Figure 8A:
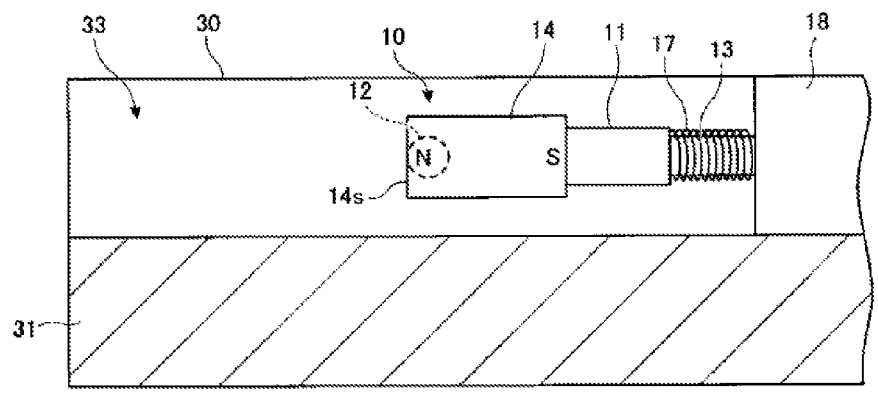
FIGS. 8A and 8B are a diagram illustrating an application example of the optical coupling member according to the present embodiment.
Figure 8B:
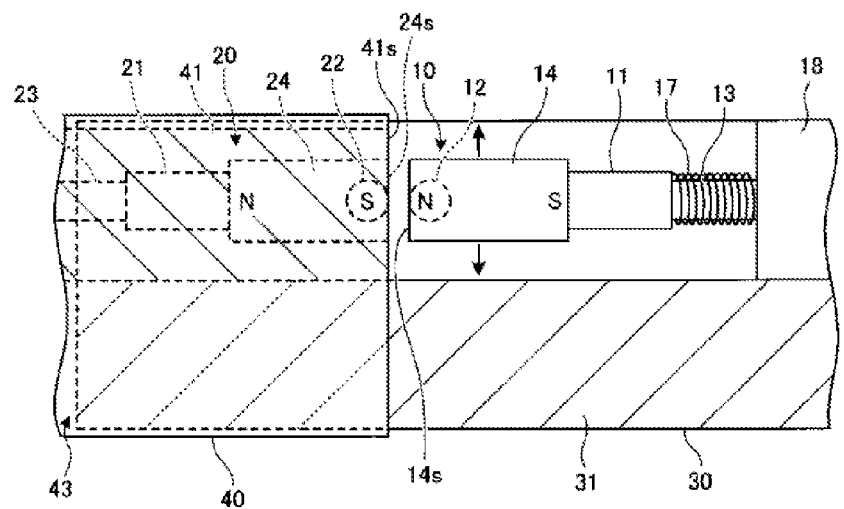

Furthermore, the optical coupling member 10 according to the present embodiment not only can be configured independently but also can be incorporated as part of another connector. Hereinafter, application examples of the optical coupling member 10 according to the present embodiment will be described with reference to FIGS. 7A and 7B and FIGS. 8A and 8B. FIGS. 7A and 7B and FIGS. 8A and 8B are diagrams illustrating application examples of the optical coupling member 10 according to the present embodiment. FIGS. 7A and 7B show a perspective view of an electric connector supporting the USB (universal serial bus) standard. FIG. 7A illustrates an A-type male side USB connector 30 and FIG. 7B illustrates an A-type female side USB connector 40. FIGS. 8A and 8B show schematic views of the A-type USB connectors 30 and 40 seen from one side. Note that in FIGS. 8A and 8B, contact terminals 32 and 42 of the USB connectors 30 and 40 are omitted for convenience of description.

As shown in FIG. 7A, the male side USB connector 30 is provided with a pedestal part 31 on a bottom side and four contact terminals 32 for transmission of electric signals are provided on a top surface of the pedestal part 31. Furthermore, a space 33 is formed above the pedestal part 31. On the other hand, as shown in FIG. 7B, the female side USB connector 40 is provided with a pedestal part 41 on an upper side and four contact terminals 42 are provided on an undersurface of the pedestal part 41. A space 43 is formed below the pedestal part 41.

The optical coupling member 10 according to the present embodiment is incorporated, for example, into the male side USB connector 30. The optical coupling member 10 is disposed at a position on the back side of the space 33 as shown in FIG. 7A. A plurality of (here two) optical coupling members 10 are disposed in the space 33. Each optical coupling member 10 is held so as to be slightly movable in the space 33, in a front-back direction (left-right direction shown in FIGS. 8A and 8B), a left-right direction (depth direction in the figure shown in FIGS. 8A and 8B) and an up-down direction. The optical coupling member 10 includes, for example, a coil spring 17 placed around the optical fiber 13. A front end portion of the coil spring 17 is fixed to a rear end portion of the holder 11 and a rear end portion thereof is fixed to the front side of the inner wall surface 18 of the USB connector 30. By being connected to the USB connector 30 via the coil spring 17, the optical coupling member 10 is held so as to be movable in the space 33. By an urging force of the coil spring 17, the optical coupling member 10 is disposed at an initial position where it is not in contact with any surrounding member in the space 33. Note that the configuration for slightly movably holding the optical coupling member 10 in the space 33 is not limited to the coil spring 17, but can be changed as appropriate. For example, a configuration may also be adopted in which the optical coupling member 10 is enclosed by a flexible elastomer material so as to be movably held.

On the other hand, the optical coupling member 20 which is a coupling target is incorporated, for example, into the female side USB connector 40. The optical coupling member 20 is disposed at a position of the pedestal part 41 corresponding to the optical coupling member 10 of the USB connector 30. When the male side USB connector 30 has the configuration shown in FIG. 7A, a plurality of (here, two) optical coupling members 20 are embedded in the pedestal part 41. For example, the optical coupling member 20 is disposed so that the cross section 24s of the magnet 24 is located on the same plane as that of an end face 41s of the pedestal part 41 (see FIG. 8B). Note that the optical coupling member 20 may be disposed slightly inside the end face 41s of the pedestal part 41. In this case, a tapered surface is preferably formed in the pedestal part 41 centered on the optical coupling member 20.

By having such a configuration and by inserting the male side USB connector 30 into the female side USB connector 40, a top surface of the contact terminal 32 remains in contact with an undersurface of the contact terminal 42, making it possible to transmit an electric signal. Furthermore, the cross section 14s of the magnet 14 of the optical coupling member 10 remains in close contact with the cross section 24s of the magnet 24 of the optical coupling member 20. This causes the center of the ball lens 12 held in the holder 11 to align with the center of the ball lens 22 held in the holder 21. As a result, it is possible to transmit an optical signal propagating through the optical fiber 13 (23) to the optical fiber 23 (13) via the ball lenses 12, 22 (22, 12).

As described above, the optical coupling member 10 is held in the space 33 so as to be slightly movable. When the USB connector 30 is inserted into the USB connector 40, the optical coupling member 10 is coupled with the optical coupling member 20 while slightly adjusting its position by an attracting force between the magnets 14 and 24 (see FIG. 8B). This allows the user to couple the optical coupling members 10 and 20 by only inserting the USB connector 30 without paying attention to the positions of the optical coupling members 10 and 20. When decoupling the optical coupling members 10 and 20, the USB connector 30 needs only to be pulled out from the USB connector 40. Therefore, even when the optical coupling members 10 and 20 are applied to such USB connectors 30 and 40, it is possible to transmit an optical 1 signal to the optical fibers 13 and 23 without requiring any complicated coupling operation.

Thus, the optical coupling member 10 according to the present embodiment can be incorporated into an electric connector such as the USB connector 30. In this case, by only connecting the USB connector 30 to the USB connector 40, it is possible to transmit an electric signal together with an optical signal propagating through the optical fiber 13 to/from a connection target such as a computer on which the USB connector 40 is mounted, and it is thereby possible to simplify a connection operation by the user.

(Optical Connector)

Next, a suitable configuration of the optical connector will be described in detail with reference to the accompanying drawings below. Optical connectors are classified into a female type (receptacle) and a male type (plug), and both the female type and the male type are provided with characteristic configurations of the present invention as an example. Therefore, the following description will focus on the female type optical connector and the optical coupling member used therefor unless specified otherwise, and the optical coupling member used for the male type optical connector will be described as a "coupling target."

Figure 9:
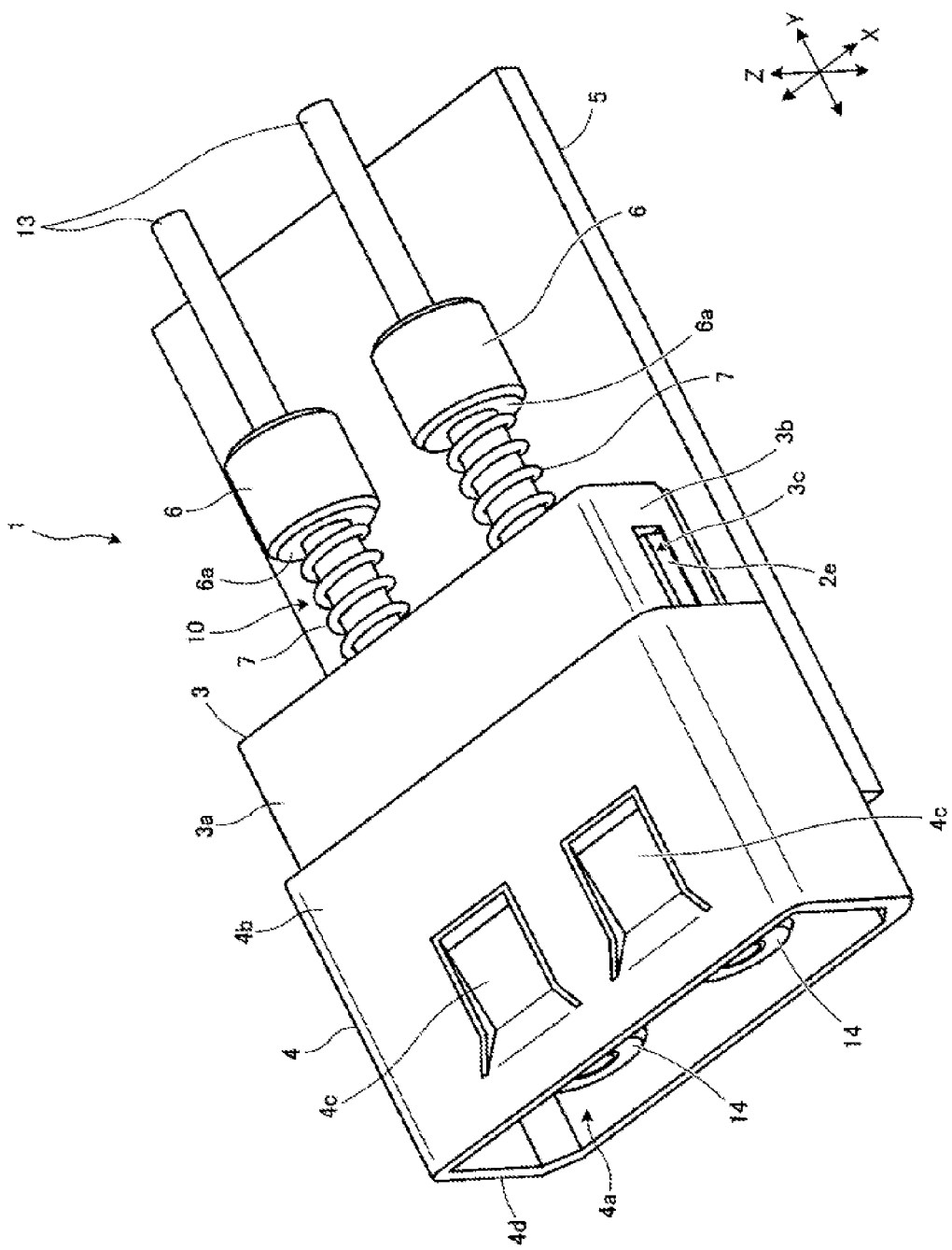
FIG. 9 is a partial perspective view of an optical connector (female type) according to the present embodiment.
Figure 10:
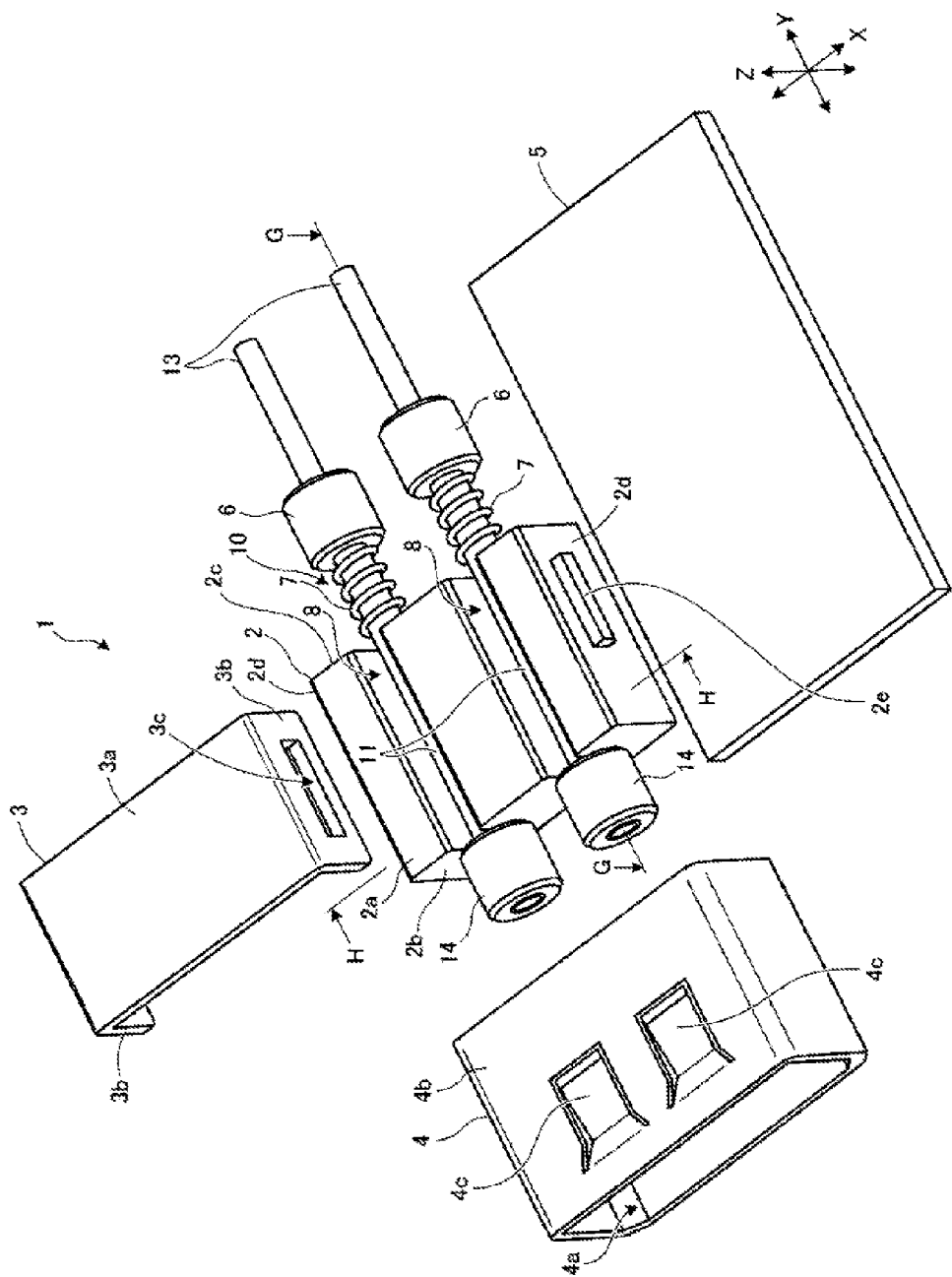
FIG. 10 is an exploded perspective view when the optical connector shown in FIG. 9 is broken down into components.
Figure 13A:
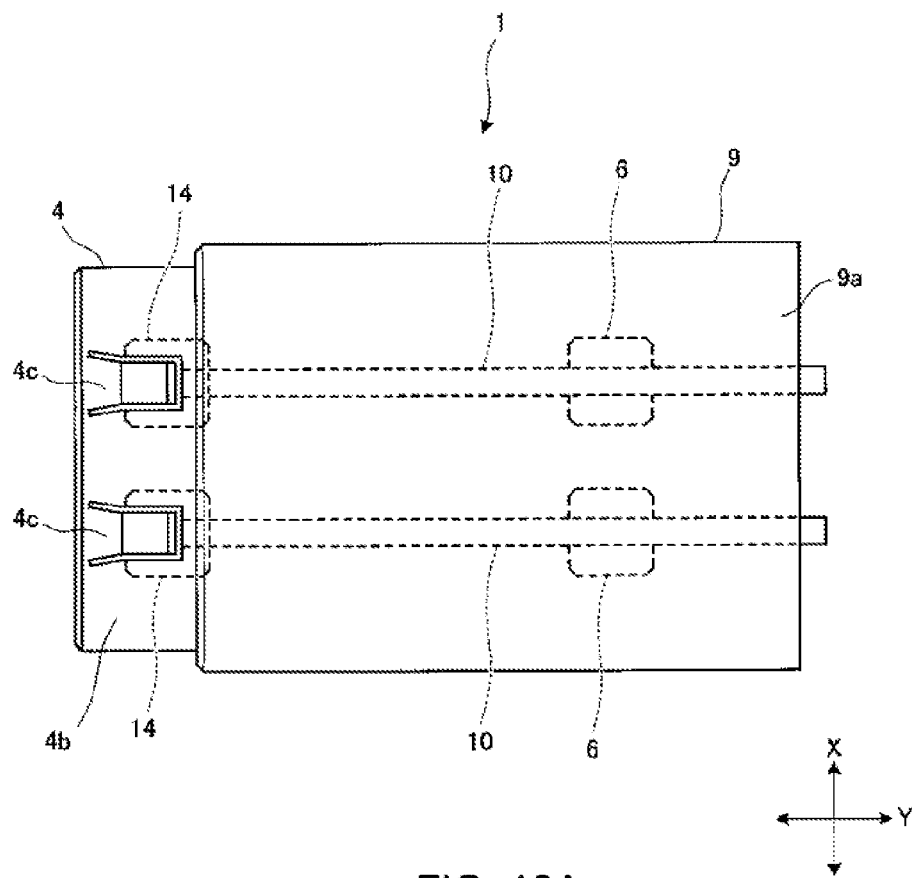
FIG. 13A is a plan view of an optical connector (female type) according to the present embodiment and FIG. 13B is a side view of the optical connector (female type) according to the present embodiment.
Figure 13B:
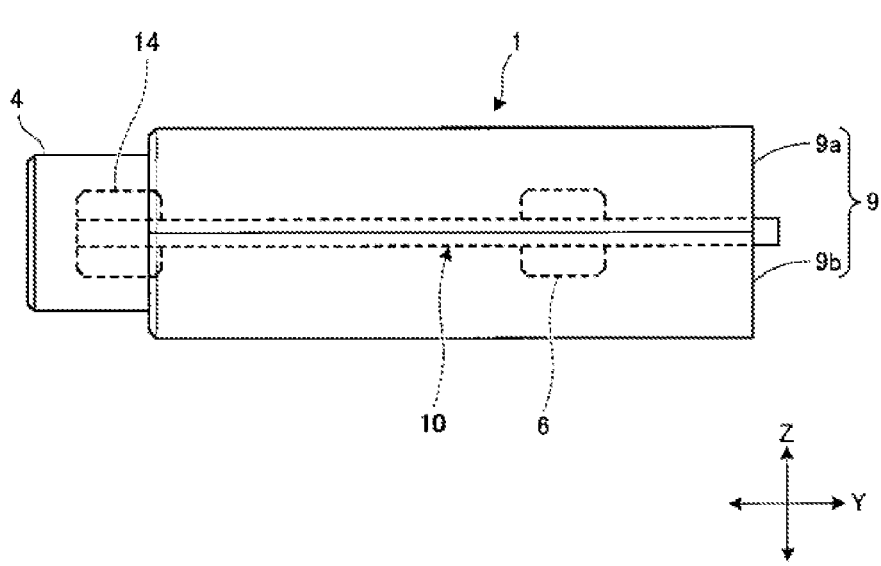

FIG. 9 is a partial perspective view of an optical connector (female type) according to the present embodiment. FIG. 10 is an exploded perspective view when the optical connector shown in FIG. 9 is broken down into components. For convenience of description, a connection side with respect to an opposing side optical connector 100 (see FIGS. 15A and 15B) with respect to the optical connector 1 is called a "front side (one end side)" and a side opposite to the connection side is called a "rear side (the other end side)." In FIG. 9 and FIG. 10, the lower side in the figure corresponds to the front side and the upper side in the figure corresponds to the rear side. In FIGS. 13A and 13B and FIG. 14B, the left side in the figure corresponds to the front side and the right side in the figure corresponds to the rear side. Furthermore, in the figures, an X-direction and a Y-direction refer to two directions orthogonal to each other within a horizontal plane, the X-direction is a direction in which a plurality of optical coupling members are arranged in the optical connector and the Y-direction is a direction in which the optical coupling member extends. The Z-direction refers to a height direction orthogonal to the X-direction and the Y-direction. The relationship between the X-direction, the Y-direction and the Z-direction is the same in other figures.

The optical connector 1 shown in FIG. 9 and FIG. 10 is constructed of the optical coupling member 10, a guide member 2 which is an example of a movement restricting member, a cover member 3, a shield case 4 including an opening 4a and a base part 5. First, the optical coupling member 10 will be described.

Figure 11:
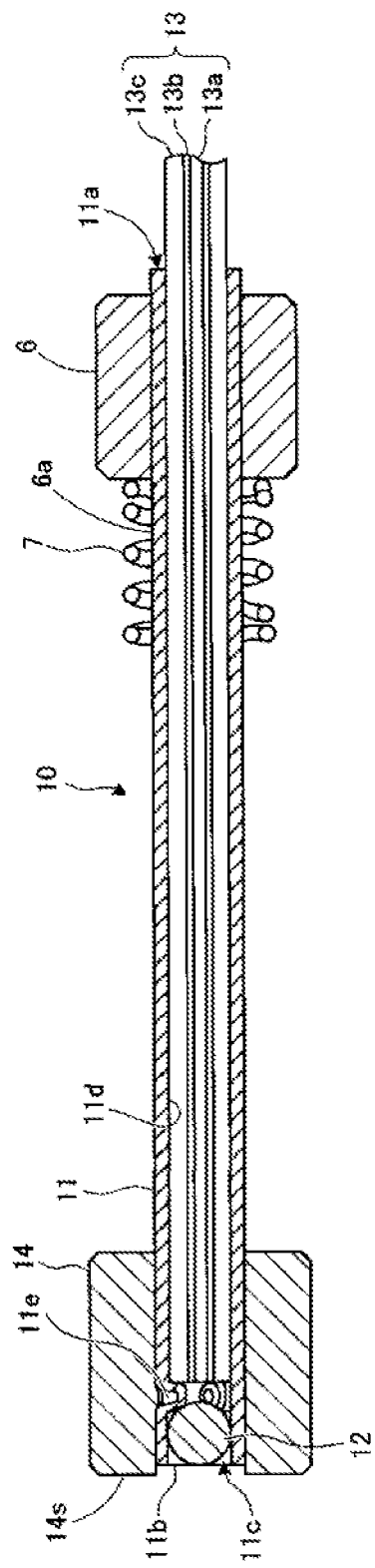
FIG. 11 is a diagram illustrating an optical coupling member according to the present embodiment used for the optical connector in FIG. 9 and is a partial longitudinal cross-sectional view seen from an arrow direction of a line G-G shown in FIG. 10.

FIG. 11 is a diagram illustrating the optical coupling member according to the present embodiment used for the optical connector in FIG. 9 and is a partial longitudinal cross-sectional view seen from an arrow direction of a line G-G shown in FIG. 10. Note that parts assigned reference numerals identical to those in FIG. 2 are members identical to those in FIG. 2. Therefore, refer to FIG. 2 for description of each member.

As shown in FIG. 11, the optical coupling member 10 includes the holder 11 which is a generally cylindrical holding member, the ball lens 12 held at one end of the holder 11, and the magnet 14 as an attracting member provided on an outer circumference at one end of the holder 11. For example, a plastic optical fiber is preferably inserted as the optical fiber 13 in the optical coupling member 10.

Note that in the present embodiment, as shown in FIG. 11, the magnet 14 is fixed to the holder 11 so that the cross section 14s of the front end portion of the magnet 14 is located at a position slightly ahead of the front end portion of the holder 11. As described above, the front end portion of the ball lens 12 housed in the housing section 11c is disposed at the same position as the front end portion of the holder 11. Therefore, the cross section 14s of the front end portion of the magnet 14 is disposed slightly ahead of the position of the front end portion of the ball lens 12.

Furthermore, the vicinity of the front end portion of the magnet 14 is magnetized to an N-pole and the vicinity of the rear end portion thereof is magnetized to an S-pole. The magnet 14 and the magnet 24 of the optical coupling member 20 which is the coupling target attract each other, playing the role of aligning the center of the ball lens 12 with the center of the ball lens 22 of the optical coupling member 20 (see FIGS. 19A, 19B and 19C).

As shown in FIG. 11, a stopper member 6 is provided in the vicinity of the insertion hole 11a of the holder 11, that is, on the rear end side of the holder 11. The stopper member 6 has a function of preventing the optical coupling member 10 from protruding forward more than necessary. The stopper member 6 is fixed, for example, to the outer circumferential surface of the holder 11 using an adhesive. The stopper member 6 is formed in a cylindrical shape (ring shape) provided with a through hole as shown in FIG. 9 to FIG. 11 and the portion of the holder 11 of the optical coupling member 10 is inserted into the through hole of the stopper member 6. However, the shape of the stopper member 6 in the present embodiment is not limited. The stopper member 6 may be partially provided on the outer circumferential surface of the holder 11 or a plurality of stopper members 6 may be intermittently provided on the outer circumferential surface of the holder 11. The material of the stopper member 6 is resin, metal or the like, but the material thereof is not particularly limited.

As shown in FIG. 9 to FIG. 11, a coil spring 7 is provided on a front end face 6a of the stopper member 6 as an urging member. The coil spring 7 is made up of a tensile coil spring. As shown in FIG. 9 and FIG. 10, the coil spring 7 is connected to a rear end face 2c of the guide member 2, which will be described next. That is, the coil spring 7 connects the rear end face 2c of the guide member 2 and the front end face 6a of the stopper member 6 attached to the optical coupling member 10 on the rear end side of the guide member 2.

Next, the guide member 2 will be described. The guide member 2 has a block shape formed of an electric insulating member such as resin and bottomed concave guide grooves 8, 8 linearly extending from a front end face (one end face) 2b to the rear end face (the other end face) 2c are formed on the surface (undersurface) facing the top surface 2a (surface (underface) facing the base part 5) of the guide member 2. The holders 11 of the respective optical coupling members 10 are individually disposed in the respective guide grooves 8, 8. Note that as shown in FIG. 10, the portions of the holders 11 of the respective optical coupling members 10 are disposed in the respective guide grooves 8 and the portions of the magnets 14 protrude ahead of the front end face 2b of the guide member 2.

Figure 12:
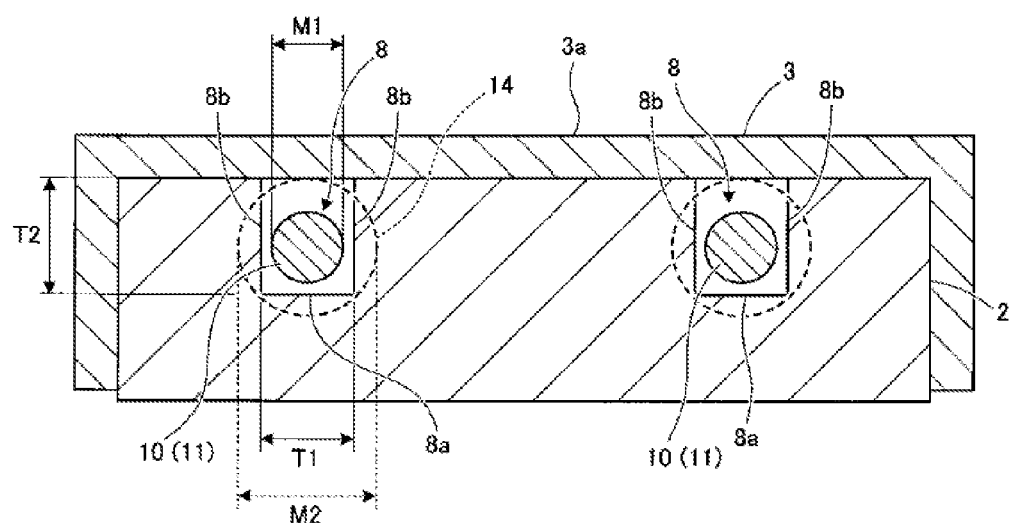
FIG. 12 is a longitudinal cross-sectional view seen from an arrow direction of a line H-H of the guide member, optical coupling member and cover member when the cover member shown in FIG. 10 is attached to the guide member in which the optical coupling member is disposed.

FIG. 12 is a longitudinal cross-sectional view seen from an arrow direction of a line H-H of the guide member, optical coupling member and cover member when the cover member shown in FIG. 10 is attached to the guide member in which the optical coupling member is disposed. As shown in FIG. 12, each guide groove 8 is provided with a bottom surface 8a and wall surfaces 8b located on both sides of the bottom surface 8a in the X-direction. As shown in FIG. 12, a width of the guide groove 8, that is, a distance between wall surfaces 8b, 8b on both sides (distance in the X-direction) is T1. The width T1 is greater than the optical coupling member 10 disposed in the guide groove 8 (diameter M1 of a portion where the holder 11 is located as the outer circumferential surface in FIG. 12). Therefore, there is a clearance (gap) required for T1-M1 in the X-direction between the guide groove 8 and the optical coupling member 10. On the other hand, the width T1 of the guide groove 8 is smaller than the width of the optical coupling member 10 of a portion in which the magnet 14 is disposed (the magnet 14 is shown by a dotted line in FIG. 12; note that the width of the optical coupling member 10 of the portion in which the magnet 14 is located as an outer circumferential surface is denoted by a diameter M2) M2. Therefore, the portion of the magnet 14 is held so as to protrude ahead of the front end face 2b of the guide member 2 without entering the guide groove 8.

Furthermore, as shown in FIG. 12, the height of each guide groove 8, that is, the height of the wall surface 8b in the Z-direction is T2. The height T2 is greater than the diameter M1 of the optical coupling member 10 disposed in the guide groove 8. As shown in FIG. 12, the top of the guide groove 8 is covered with the cover member 3, which gives a clearance (gap) of T2-M1 in the up-down direction (Z-direction) of the optical coupling member 10 disposed in the guide groove 8. Moreover, the height T2 of the guide groove 8 is smaller than the diameter M2 of the optical coupling member 10 of the portion provided with the magnet 14. Note that it may be enough that the width T1 and the height T2 of the guide groove 8 have a dimensional relationship that T1 and T2 are smaller than at least one of the width and height of the optical coupling member 10 of the portion provided with the magnet 14.

As described above, on the rear end side of the guide member 2, the coil spring 7 is connected between the front end face 6a of the stopper member 6 of the optical coupling member 10 and the rear end face 2c of the guide member 2 (see FIG. 10). The coil spring 7 is a tensile coil spring and it exerts an urging force to urge the magnet 14 toward the front end face 2b side of the guide member 2. Thus, as shown in FIG. 10, an urging force in the rear end direction of the guide member 2 acts on the optical coupling member 10 disposed in each guide groove 8 and the rear end face of each magnet 14 is held in contact with the front end face 2b of the guide member 2.

As shown in FIG. 10, long protrusions 2e are formed, for example, in the Y-direction in both side faces 2d of the guide member 2. Note that FIG. 10 shows only one protrusion 2e on one side face 2d which is visible in the figure.

As shown in FIG. 10, the cover member 3 is constructed of a plate-shaped ceiling part 3a and outside wall parts 3b, 3b folded vertically downward on both sides of the ceiling part 3a in the X-direction. The cover member 3 is formed of resin or non-magnetic metal or the like. When the cover member 3 is formed, for example, of resin, the cover member 3 made up of the ceiling part 3a and the outside wall parts 3b can be molded through injection molding or the like. Alternatively, when the cover member 3 is formed of a non-magnetic metallic material, a metal plate may be folded to make up the ceiling part 3a and the outside wall parts 3b. As shown in FIG. 10, an elongated long hole 3c is formed in the Y-direction in the outside wall part 3b provided on both sides of the cover member 3 in the X-direction. Note that FIG. 10 shows only one long hole 3c in the one outside wall part 3b which is visible in the figure. The size of the long hole 3c is substantially the same as the size of the protrusion 2e provided in the guide member 2. In an assembly step of the optical connector 1, the cover member 3 is assembled from above the guide member 2, the protrusion 2e of the guide member 2 as shown in FIG. 9 is fitted into the long hole 3c of the over member 3 and the cover member 3 is thereby fixed to the guide member 2.

The shield case 4 shown in FIG. 9 and FIG. 10 is formed of a metal. The shield case 4 is provided with an opening 4a which penetrates from the front end side to the rear end side. Furthermore, as shown in FIG. 9 and FIG. 10, a pair of elastic tongue pieces 4c are formed through cutting and raising at a certain interval in the X-direction on a top surface part 4b of the shield case 4.

As shown in FIG. 9, the assembled member of the guide member 2, optical coupling member 10 and cover member 3 is fitted into the rear end side of the shield case 4. Thus, the size of the opening 4a of the shield case 4 is formed in a size that allows the assembled member of the guide member 2, optical coupling member 10 and cover member 3 to be fitted therein. In the present embodiment, it is possible to press-fit the above assembled member into the opening 4a of the shield case 4 or join the outer surface of the assembled member and the inner circumferential surface of the shield case 4 via an adhesive. As shown in FIG. 9, the insertion position of the assembled member of the guide member 2, optical coupling member 10 and cover member 3 with respect to the shield case 4 is defined so that the magnet 14 of the optical coupling member 10 is located behind the front end circumferential surface 4d of the shield case 4 and the ceiling part 3a of the cover member 3 is located behind the elastic tongue pieces 4c (also see FIG. 13A and FIG. 14B or the like which will be described later).

The undersurfaces of the shield case 4 and the guide member 2 integrated as described above are joined to the top surface of the base part 5 via an adhesive or the like. In this case, although not particularly shown in FIG. 10, if the undersurfaces of the shield case 4 and the guide member 2 are both flat surfaces, a height difference is produced between the undersurfaces of the integrated shield case 4 and guide member 2. For this reason, if the top surface of the base part 5 is also a flat surface as shown in FIG. 10, it is not possible to appropriately plane-bond the undersurfaces of the shield case 4 and the guide member 2 and the top surface of the base part 5, and therefore it is possible, for example, to provide a height difference on the undersurface of the guide member 2 in advance so that when integrated with the shield case 4, the undersurfaces of the guide member 2 and the shield case 4 are configured to form a continuous flat surface. Alternatively, by providing a height difference opposite to the height difference formed between the undersurfaces of the integrated shield case 4 and guide member 2 on the top surface side of the base part 5, it is possible to appropriately join the undersurfaces of the shield case 4 and guide member 2 and the top surface of the base part 5 as a concavo-convex junction. Note that in FIG. 9 and FIG. 10, the base part 5 is formed of a planar board, and, for example, the base part 5 constitutes part of a housing. That is, the base part 5 corresponds to the bottom part of a housing 9 shown in FIGS. 13A and 13B extracted for illustration. Alternatively, the base part 5 may be provided apart from the housing 9, the base part 5 may be disposed on an inner circumferential surface of the housing 9 to be used as a pedestal to fix the shield case 4 and the guide member 2. The base part 5 and the housing 9 are formed of an insulating member such as resin.

FIG. 13A is a plan view of an optical connector (female type) according to the present embodiment and FIG. 13B is a side view of the optical connector (female type) according to the present embodiment. In FIG. 13A and FIG. 13B, the optical coupling member 10 disposed inside the optical connector 1 is shown by a dotted line. For example, the housing 9 is divided into two parts of an upper side housing 9a and a lower side housing 9b. The upper side housing 9a has a configuration provided with a ceiling part and an outside wall part located on both sides of the ceiling part in the X-direction such as the cover member 3, while the lower side housing 9b has a configuration provided with a bottom part and an outside wall part facing upward located on both sides of the bottom part in the X-direction. The housing 9 in which the upper side housing 9a and the lower side housing 9b are integrated can be obtained by bonding the respective outside wall parts of the upper side housing 9a and the lower side housing 9b. A method for bonding the upper side housing 9a and the lower side housing 9b is not particularly limited, but may be chemical bonding or physical bonding such as concavo-convex engagement.

As shown in FIG. 13A and FIG. 13B, part of the shield case 4 protrudes ahead of the housing 9. As shown in FIG. 13A, an elastic tongue piece 4c which is provided on a top surface part 4b of the shield case 4 is exposed ahead of the housing 9.

Figure 14A:
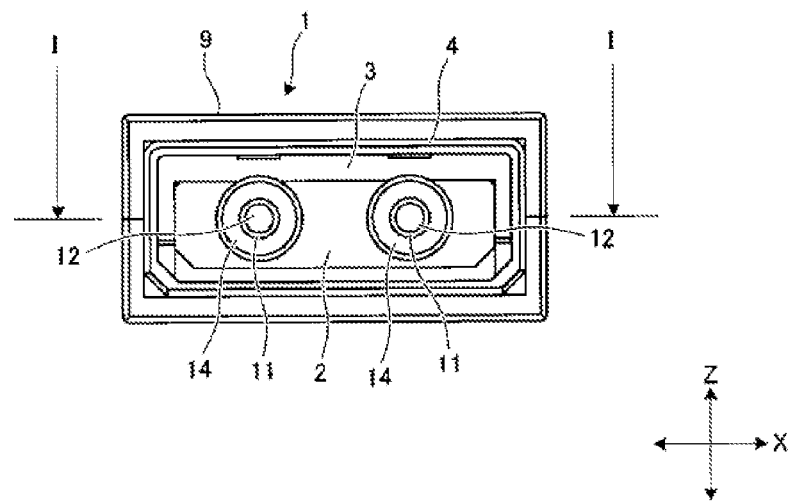
FIG. 14A is a front view of an optical connector (female type) according to the present embodiment and FIG. 14B is cross-sectional view seen from an arrow direction of a line I-I shown in FIG. 14A.
Figure 14B:
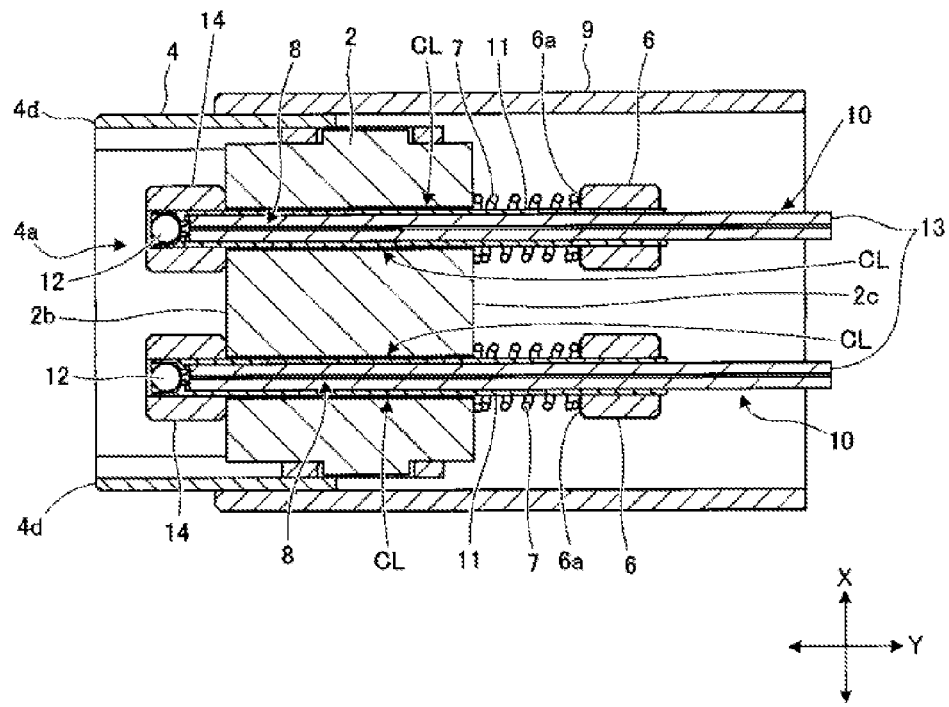

FIG. 14A is a front view of the optical connector (female type) according to the present embodiment and FIG. 14B is a cross-sectional view seen from an arrow direction of a line I-I shown in FIG. 14A. As shown in FIG. 14A, a front end face of the ring-shaped magnet 14 provided on the outer perimeter of the holder 11 is exposed on the front of the optical connector 1. Furthermore, the ball lens 12 disposed at the center of the ring-shaped magnet 14 can be observed. Although FIG. 14A shows a state in which the centers of the respective ball lenses 12 of the two optical coupling members 10 are arranged in a straight line in the X-direction, a state in which the ball lenses 12 are deviated from each other in the vertical direction (Z-direction) is also acceptable. As will be described in detail later, the optical coupling member 10 according to the present embodiment is supported in a floating configuration and the guide member 2 allows operations for alignment with a coupling target in the X-direction, Y-direction and Z-direction. Therefore, even when the center position of the ball lens 12 is slightly deviated from the X-direction toward the vertical direction, alignment with the coupling target can be achieved appropriately through the floating operation of the optical coupling member 10.

As shown in FIG. 14B, the coil spring 7 is connected between the front end face 6a of the stopper member 6 which is disposed closer to the rear end side than the guide member 2 of the optical coupling member 10 and the rear end face 2c of the guide member 2, and the optical coupling member 10 is urged toward the rear end direction by an urging force of the coil spring 7. For this reason, as shown in FIG. 14B, the rear end face of the magnet 14 is in contact with the front end face 2b of the guide member 2.

As has already been described in FIG. 12, as shown in FIG. 14B, a clearance CL is provided in the X-direction between the portion of the holder 11 of the optical coupling member 10 disposed in the guide groove 8 of the guide member 2 and the guide groove 8. In FIG. 14B, the clearance CL provided between each optical coupling member 10 and each guide groove 8 is assumed to be the same on the left and right sides, but the clearance CL may be slightly shifted to either the left or the right. As described above, the optical coupling member 10 in the present embodiment has a floating configuration and movement associated with alignment with the coupling target is allowed despite the fact that the movement of the optical coupling member with respect to the guide groove 8 of the guide member 2 is restricted. Therefore, even when there is a slight variation in the clearance CL in the X-direction between the optical coupling member 10 and the guide groove 8 shown in FIG. 14B, it is possible to appropriately achieve alignment with the coupling target through the floating operation of the optical coupling member 10. Furthermore, a clearance is also provided between the portion of the holder 11 of each optical coupling member 10 and each guide groove 8 in the vertical direction (Z-direction) (see FIG. 12).

Figure 15A:
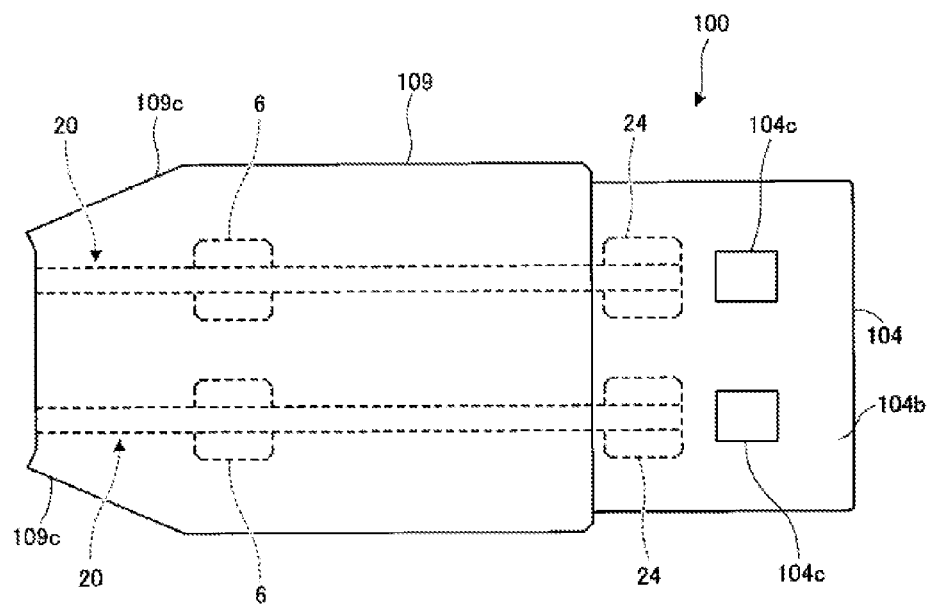
FIG. 15A is a plan view of an optical connector (male type) according to the present embodiment and FIG. 15B is a side view of the optical connector (male type) according to the present embodiment.
Figure 15B:
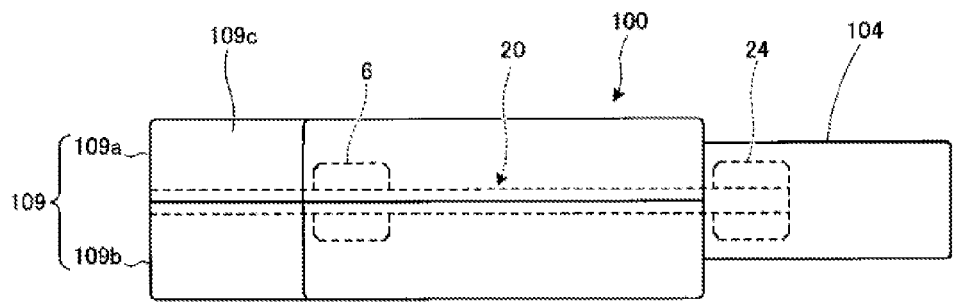
Figure 16A:
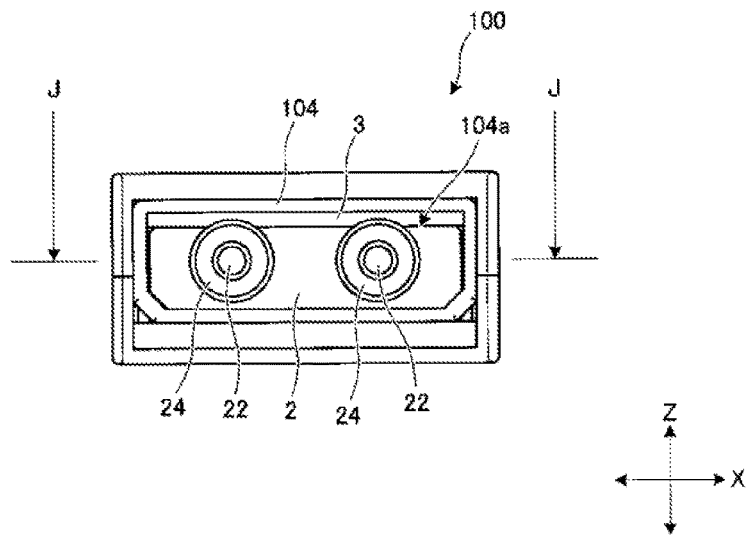
FIG. 16A is a front view of an optical connector (male type) according to the present embodiment and FIG. 16B is a cross-sectional view seen from an arrow direction of a line J-J shown in FIG. 16A.
Figure 16B:
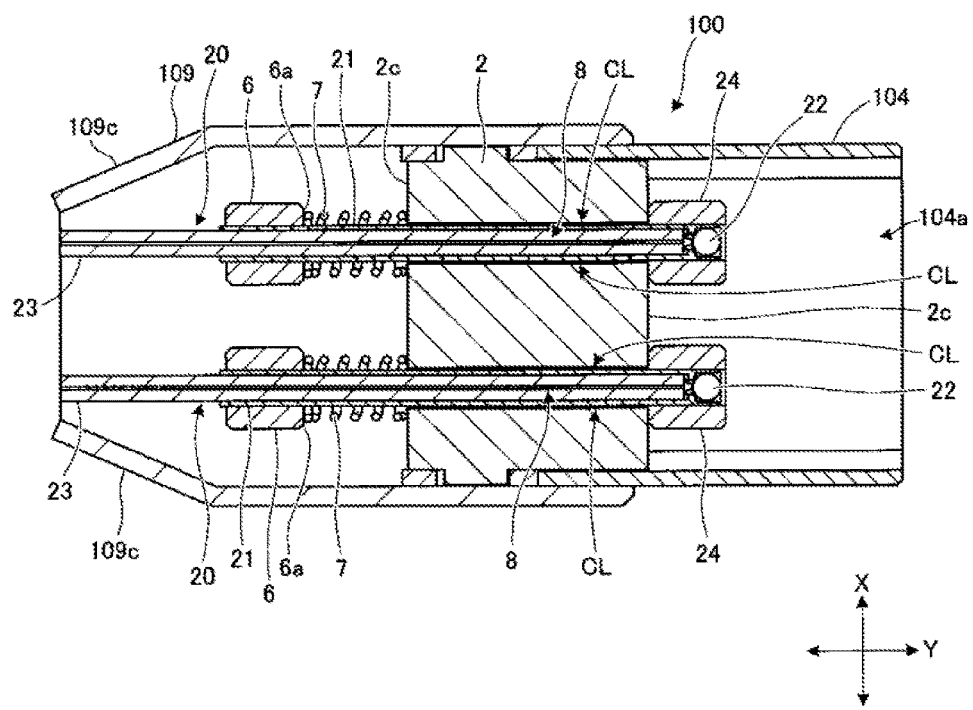

Next, the male type (plug) optical connector will be described. FIG. 15A is a plan view of the optical connector (male type) according to the present embodiment and FIG. 15B is a side view of the optical connector (male type) according to the present embodiment. FIG. 16A is a front view of the optical connector (male type) according to the present embodiment and FIG. 16B is a cross-sectional view seen from an arrow direction of a line J-J shown in FIG. 16A. In FIG. 15 and FIGS. 16A and 16B, parts as signed the same reference numerals as those in FIG. 9 to FIGS. 14A and 14B represent the same members or parts as those in FIG. 9 to FIGS. 14A and 14B, but, for convenience of description, different reference numerals are assigned among the optical coupling member, magnet, ball lens, holder and optical fiber even for the same members. However, the magnetization mode of a magnet is reversed between the female type and the male type. This aspect will be described in detail later. In FIG. 15A and FIG. 15B as well as FIG. 13A and FIG. 13B, the optical coupling member 20 disposed inside the optical connector 100 (reference numeral 24 denotes a magnet) is shown by a dotted line. Note that for the optical connector 100, the right side corresponds to the front side and the left side corresponds to the rear side.

Each optical coupling member 20 shown in FIG. 16B is a coupling target of the optical coupling member 10 shown in FIG. 14B and has the same configuration as that of the optical coupling member 10 except the magnetization direction of the magnet. That is, the optical coupling member 20 corresponds to the optical coupling member 10 shown in FIG. 14B turned by 180 degrees. Note that for convenience of description, these components are the optical coupling member 20, holder 21, ball lens 22, optical fiber 23 and magnet 24 in FIGS. 15A and 15B and FIGS. 16A and 16B.

Since the optical connector 100 shown in FIGS. 15A and 15B and FIGS. 16A and 16B are of a male type, a shield case 104 used for the optical connector 100 has an outer circumferential surface that allows it to be inserted into the opening 4a of the shield case 4 of the optical connector 1 which is of a female type. In this case, in order to allow the shield case 104 of the optical connector 100 to be press-fitted into the opening 4a of the shield case 4 of the optical connector 1 and allow mutual fixing of both connectors, the size of an inner circumferential surface of the opening 4a of the shield case 4 is made equal to the size of the outer circumferential surface of the shield case 104 or the size of the outer circumferential surface of the shield case 104 is made slightly smaller than the size of the inner circumferential surface of the opening 4a of the shield case 4. Furthermore, as shown in FIG. 16A and FIG. 16B, an opening 104a penetrating from front to back is provided in the shield case 104 and the magnet 24 of the optical coupling member 20 is exposed in the opening 104a. Moreover, the front end face of the ball lens 22 is visible from the opening 104a.

As shown in FIG. 15A, a pair of insertion holes 104c are formed in a top surface part 104b of the shield case 104 at an interval in the X-direction. Each insertion hole 104c forms a pair with each of the pair of elastic tongue pieces 4c (see FIG. 13A) provided in the X-direction on the top surface part 4b of the shield case 4. Therefore, when an operator or the like connects the optical connectors 1 and 100, the pair of elastic tongue pieces 4c provided on the top surface part 4b of the shield case 4 enter the insertion holes 104c formed in the top surface part 104b of the shield case 104 so as to be prevented from coming off. On the other hand, when the operator or the like pulls the connected optical connectors 1 and 100 apart, the elastic tongue pieces 4c are elastically deformed and come off the insertion holes 104c, thus making it easier to disconnect the optical connectors 1 and 100.

Furthermore, as shown in FIG. 15B, the housing 109 of the optical connector 100 is constructed of an upper side housing 109a and a lower side housing 109b as in the case of the housing 9 shown in FIG. 13B, and the housing 109 can be obtained by joining the upper side housing 109a and the lower side housing 109b. Furthermore, as shown in FIG. 15A, FIG. 15B and FIG. 16B, a rear end side face 109c of the housing 109 is tapered from the front to the rear. Therefore, optical connectors 1 and 100 are different because their respective housings 9 and 109 have different shapes of the rear end portion. However, the shapes of the housings 9 and 109 shown in the present embodiment are presented as examples, and the housings 9 and 109 may have the same shape or their shapes may be changed in various ways in accordance with the use. Note that by differentiating the shapes of the housings 9 and 109, it is possible to easily discern the male type from the female type from outward appearance.

Note that in the optical connector 100 shown in FIG. 16B, as in the case of FIG. 14B, the coil spring 7 is connected between the front end face 6a of the stopper member 6 and the rear end face 2c of the guide member 2 disposed closer to the rear end side (left side in the figure) than the guide member 2 of the optical coupling member 20 and the optical coupling member 20 is urged by an urging force of the coil spring 7 toward the rear end direction of the guide member 2. Thus, as shown in FIG. 16B, the rear end face of the magnet 24 remains in contact with the front end face 2b of the guide member 2. Furthermore, in FIG. 16B as well as FIG. 14B, a clearance CL in the X-direction is provided between the optical coupling member 20 (holder 21) disposed in the guide groove 8 of the guide member 2 and the guide groove 8. The clearance is also provided between the guide groove 8 and the optical coupling member 20 in the vertical direction (Z-direction).

FIG. 17A is a plan view illustrating a state in which the optical connector (female type) shown in FIG. 13A and the optical connector (male type) shown in FIG. 15A are connected together and FIG. 17B is a side view illustrating a state in which the optical connector (female type) shown in FIG. 13B and the optical connector (male type) shown in FIG. 15B are connected together. FIG. 18A is a cross-sectional view seen from an arrow direction of a line K-K shown in FIG. 17B and FIG. 18B is a longitudinal cross-sectional view seen from an arrow direction of a line L-L shown in FIG. 17A. In FIG. 17A and FIG. 17B, the optical coupling members 10 and 20 disposed inside respective optical connectors 1 and 100 are shown by a dotted line.

The operator or the like connects the optical connector 1 and the optical connector 100. In this case, the shield case 104 of the optical connector 100 which is of a male type is inserted into the opening 4a of the shield case 4 of the optical connector 1 which is of a female type, and the optical coupling member 10 and the optical coupling member 20 as a coupling target thereof are coupled through an alignment operation by a coupling operation which will be described next. Note that when the optical connector 1 and the optical connector 100 are connected, the elastic tongue piece 4c provided in the shield case 4 as shown in FIG. 18B enters the insertion hole 104c provided in the shield case 104 so as to be prevented from coming off.

Figure 19A:
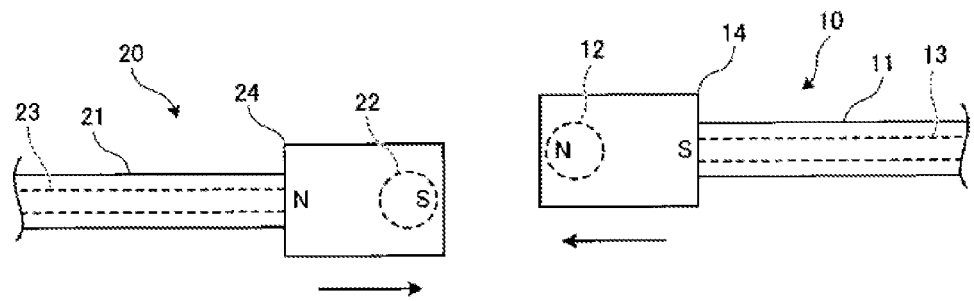
FIGS. 19A, 19B and 19C are a diagram illustrating a coupling operation of the optical coupling members according to the present embodiment.
Figure 19B:
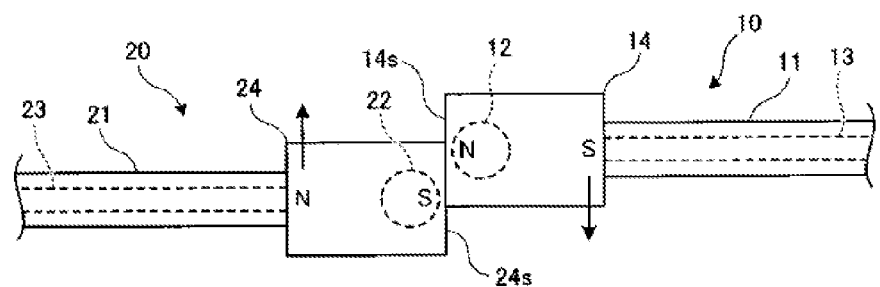
Figure 19C:
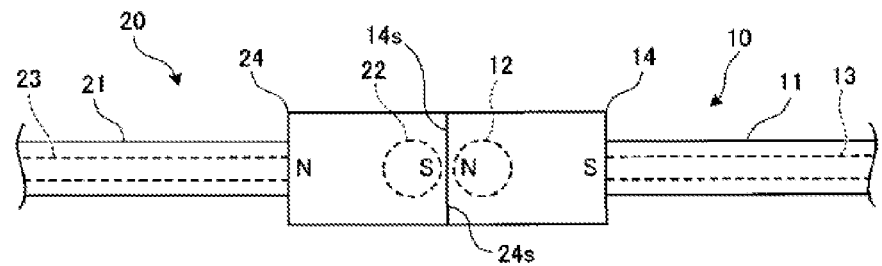

The coupling operation of coupling the optical coupling members 10 and 20 when the optical connectors 1 and 100 are connected is similar to that in FIGS. 4A, 4B and 4C, but will be newly described using FIGS. 19A, 19B and 19C. FIGS. 19A, 19B and 19C are a diagram illustrating the coupling operation of the optical coupling members 10 and 20 according to the present embodiment. In FIGS. 19A, 19B and 19C, part of the optical fibers 13 and 23 are shown by a dotted line.

The magnets 14 and 24 provided for the respective optical connectors 1 and 100 are initially in contact with the front end face 2b of the guide member 2 as shown in FIG. 14B and FIG. 16B. Here, the positions of the magnets 14 and 24 shown in FIG. 14B and FIG. 16B are deemed as "initial positions." The initial positions represent reference positions before connecting the optical connectors 1 and 100. When the operator or the like connects the optical connectors 1 and 100, the magnets 14 and 24 come closer to each other up to a certain distance in the connected shield cases 4 and 104. In this case, the magnets 14 and 24 are attracted to each other by an attracting force acting between the magnets 14 and 24 from the initial positions and mutually move forward. This causes the magnet 24 and the magnet 14 to remain in contact (see FIG. 19B).

The magnets 14 and 24 are moved by an attracting force between the magnet 24 and the magnet 14 from the state shown in FIG. 19B so that the cross section 24s on the optical coupling member 10 side of the magnet 24 and the cross section 14s on the optical coupling member 20 side of the magnet 14 are disposed so as to face each other. Here, the magnet 14 moves downward and the magnet 24 moves upward. Thus, as shown in FIG. 19C, the cross section 24s on the optical coupling member 10 side of the magnet 24 and the cross section 14s on the optical coupling member 20 side of the magnet 14 remain in close contact with each other.

The optical coupling member 10 and the optical coupling member 20 have the same positional relationship among the respective components. For this reason, when the cross section 24s on the optical coupling member 10 side of the magnet 24 and the cross section 14s on the optical coupling member 20 side of the magnet 14 remain in close contact with each other, the center of the ball lens 12 coincides with the center of the ball lens 22. Note that in the present embodiment, both the optical coupling members 10 and 20 are allowed to perform an alignment operation, but when, for example, the coupling target is fixed and remains immobile, only the optical coupling member 10 moves as shown in FIG. 19A and FIG. 19B and is coupled with the coupling target.

Note that in the present embodiment, a plurality of optical coupling members 10 and 20 are arranged in each optical connector 1 or 100. Therefore, there are a plurality of sets of the optical coupling members 10 and 20 that are connected. Coupling timing of the respective sets can be substantially simultaneous or coupling timing can be changed. For example, coupling timing of the respective sets in the above-described optical connectors 1 and 100 is defined to be substantially simultaneous. "Substantially simultaneous" is a concept not meaning being exactly simultaneous but including manufacturing errors or the like.

According to the present embodiment, in the coupling operation described in FIGS. 19A, 19B and 19C, a movement restricting member is used to exercise restrictions allowing an operation of alignment of the optical coupling member 10 with the optical coupling member 20 which is its coupling target but preventing the further movement. Hereinafter, movement restrictions on the optical coupling member 10 will be described. Though description is omitted, the same movement restrictions apply to the optical coupling member 20 as well. The optical coupling member 10 in the present embodiment is supported in a floating structure. That is, the optical coupling member 10 is supported so as to be movable in all the three axial directions: left-right direction (X-direction), front-back direction (Y-direction) and up-down direction (Z-direction). However, when free moments of the optical coupling member 10 in the three axial direction are allowed and no movement restrictions are exercised, if a plurality of optical coupling members 10 are provided in parallel, initial positions of the respective optical coupling members 10 are not stable due to a repulsive force or attracting force generated among the respective optical coupling members. Furthermore, in the case where only one optical coupling member 10 is disposed, alignment accuracy is likely to deteriorate when the optical coupling member 10 is incorporated into the optical connector 1, and when a strong impact is added to the optical connector 1, the optical coupling member 10 may violently collide with the housing or the like, risking damaging the ball lens 12 or the like. Thus, when the initial position of the optical coupling member 10 is not stable, coupling with the coupling target with high alignment accuracy is not possible or coupling with the coupling target itself may be impossible. Therefore, the present embodiment provides the movement restricting member that restricts movement of the optical coupling member 10 while allowing an operation of alignment of the optical coupling member 10 with the coupling target.

As described above, in the optical coupling member 10, since the center of the ball lens 12 is aligned with the center of the ball lens 22 of the optical coupling member 20 by the attracting force of the magnet 14 provided in the holder 11, the operator or the like can only connect the optical connectors 1 and 100 to simply and automatically align the ball lens 12 with the ball lens 22. In this case, movements of the optical coupling member 10 other than the operation of alignment with the coupling target are restricted. This makes it possible to improve the accuracy of alignment with the coupling target without requiring any complicated coupling operation and improve the propagation efficiency of light in the optical fiber.

To be more specific, in the present embodiment, the guide member 2 is used as the movement restricting member. The guide groove 8 is formed from the front end to the rear end of the guide member 2 and in the optical coupling member 10, the holder 11 is disposed in the guide groove 8 with the magnet 14 protruding from the front end side of the guide member 2. As shown in FIG. 12, the width T1 and height T2 of the guide groove 8 are greater than the diameter (width) M1 of the optical coupling member 10 of the portion disposed in the guide groove 8. Thus, when an attracting force is generated between the magnets 14 and 24 through the connection of the optical connectors 1 and 100, the optical coupling member 10 can appropriately move toward the direction of coupling with the optical coupling member 20 which is the coupling target through the guide groove 8. Furthermore, since the width T1 and height T2 of the guide groove 8 are greater than the diameter of the optical coupling member 10 of the portion disposed in the guide groove 8, a clearance is generated between the holder 11 and the guide groove 8. Therefore, the optical coupling member 10 can appropriately move within the range of the clearance formed in the left-right direction (X-direction) and the height direction (Z-direction) crossing the extending direction (front-back direction; Y-direction) of the guide groove 8. Therefore, in the optical coupling member 10, operation of alignment with the coupling target is allowed in the three axial directions and it is possible to appropriately align the centers of the ball lenses 12 and 22 of the optical coupling member 10 and the optical coupling member 20 which is the coupling target. In addition, the bottom surface 8a and the wall surface 8b of the guide groove 8 and the ceiling part surface of the cover member 3 that covers the top surface of the guide groove 8 constitute a restricting surface that prevents the optical coupling member 10 from moving more than necessary. Furthermore, since the width T1 and height T2 of the guide groove 8 are smaller than the diameter M2 of the optical coupling member 10 of the port ion provided with the magnet 14, it is possible to prevent the magnet 14 from entering the guide groove 8 of the guide member 2 and restrict the optical coupling member 10 from moving more than necessary in the rear end direction. This makes it possible to appropriately restrict the movement of the optical coupling member 10 while allowing an operation of alignment of the optical coupling member 10 with the optical coupling member 20 which is the coupling target.

In the above present embodiment, the number of optical coupling members 10 incorporated into the optical connector 1 is two, but the number of optical coupling members 10 is not limited. The number of optical coupling members 10 may be one or three or more. According to the present embodiment, when a plurality of optical coupling members 10 are provided, the guide groove 8 provided for the guide member 2 is preferably provided individually for each optical coupling member 10. That is, when the number of optical coupling members 10 is two, two guide grooves 8 are also formed; when the number of optical coupling members 10 is four, four guide grooves 8 are formed. It is thereby possible to prevent the respective optical coupling members 10 from separating from or approaching each other by the width of the guide groove 8 or more due to a magnetic force (attracting force) between the magnets 14 of the plurality of optical coupling members 10 incorporated into the optical connector 1. Therefore, it is possible to stably hold the initial positions of the plurality of optical coupling members 10.

Furthermore, in the optical coupling member 10 according to the present embodiment, the center of the ball lens 12 is aligned with the center of the ball lens 22 of the optical coupling member 20 by the attracting force from the magnet 14. For this reason, it is possible to easily attach/detach the optical coupling member 10 to/from the optical coupling member 20 and also repeatedly perform attachment/detachment for a long period of time.

The shapes of the cross sections 14s and 24s of the respective magnets 14 and 24 disposed in the optical connectors 1 and 100 are configured to be identical. For this reason, the cross sections 14s and 24s can be brought into close contact with each other by the attracting force between the magnets 14 and 24. This allows the optical coupling member 10 to be stably coupled with the optical coupling member 20.

In the magnet 14 disposed in the optical connector 1 in particular, the outside shape of the cross section 14s on the optical coupling member 20 side which is the coupling target is configured into a perfect circle shape, whose center corresponds to the center of the ball lens 12. This prevents the magnet 14 from rotating when it is attracted by the magnet 24 of the optical coupling member 20. It is thereby possible to prevent the rotation of the holder 11 in which the magnet 14 is provided, and prevent the optical fiber 13 held in the holder 11 from twisting.

Furthermore, the cross section 14s on the optical coupling member 20 side of the magnet 14 disposed in the optical connector 1 protrudes ahead of the front end portion (end portion on the optical coupling member 20 side) of the ball lens 12. Similarly, in the magnet 24 disposed in the optical connector 100, the cross section 24s on the optical coupling member 10 side also protrudes ahead of the front end portion of the ball lens 22 (end portion on the optical coupling member 10 side). Thus, even when the cross sections 14s and 24s of the magnets 14 and 24 come into contact with each other, the ball lenses 12 and 22 do not come into contact with each other, and it is thereby possible to prevent damages to the surfaces of the ball lenses 12 and 22. Note that the distance between the ball lens 12 and the ball lens 22 when the magnets 14 and 24 are in contact is preferably 1 mm or less. This makes it possible to prevent propagation efficiency of light in the optical fiber 13 from deteriorating.

Figure 20:
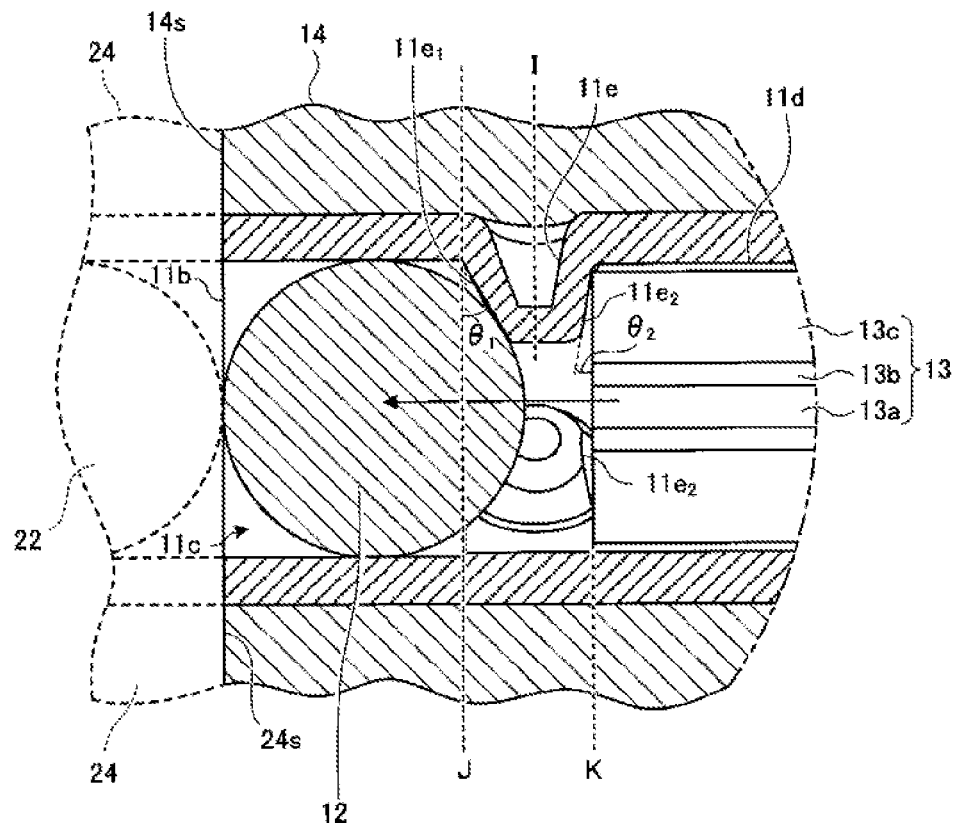
FIG. 20 is a diagram illustrating an optical coupling member according to a modification example of the present embodiment.

The positional relationship between the cross sections 14s and 24s of the magnets 14 and 24 and the ball lenses 12 and 22 is not limited to the one described above. For example, as has already been described, by arranging the cross sections 14s and 24s of the magnets 14 and 24 and the ball lenses 12 and 22 at the same position as shown in FIG. 20, it is possible to shorten the distance between the ball lenses 12 and 22 and thereby prevent propagation efficiency of light in the optical fiber 13 from deteriorating as the distance between the ball lenses 12 and 22 increases.

Furthermore, one of the cross sections 14s and 24s of the magnets 14 and 24 may be caused to protrude ahead of the front end portions of the ball lenses 12 and 24, and the other cross sections 14s and 24s may be arranged at the same position as the front end portion of the ball lenses 12 and 24. Note that even in such a case, the distance between the ball lens 12 and the ball lens 22 when the magnets 14 and 24 come into contact with each other is preferably 1 mm or less. It is thereby possible to prevent propagation efficiency of light in the optical fiber 13 from deteriorating.

In the present embodiment, as shown in FIG. 14B or the like, the coil spring 7 is provided as the urging member to urge the magnet 14 that protrudes on the front end side of the guide member 2 toward the direction of the front end face 2b of the guide member 2. To be more specific, the coil spring 7 is a tensile coil spring that connects the rear end face 2c of the guide member 2 and the front end face 6a of the stopper member 6 provided in the optical coupling member 10 behind the rear end face 2c of the guide member 2. Furthermore, the urging force of the coil spring 7 is set to be weaker than the magnetic force (attracting force) acting between the magnet 14 and the magnet 24 which is the coupling target of the magnet 14. This causes the magnet 14 of the optical coupling member 10 to move forward from the initial position at which it is in contact with the front end face 2b of the guide member 2 by the magnetic force acting between the magnets 14 and 24 by the connection between the optical connectors 1 and 100, causing the optical coupling members 10 and 20 to be coupled together appropriately. Furthermore, when the connected optical connectors 1 and 100 are pulled apart, the magnets 14 and 24 are separated apart and in this case, the magnet 14 of the optical coupling member 10 is appropriately returned to the initial position at which the magnet 14 of the coupling member 10 comes into contact with the front end face 2b of the guide member 2 by the urging force of the coil spring 7. Note that the "urging force" in the present embodiment is a force to return the optical coupling member 10 to its original position when the connected optical coupling member 10 and optical coupling member 20 are decoupled and the urging force need not be acting on the optical coupling member 10 in the state of the initial position.

In the above embodiment, the coil spring 7 is used as the urging member to return the optical coupling member 10 to the initial position when the connected optical coupling members 10 and 20 are decoupled, but rubber or the like as an elastic body other than the coil spring 7 may be used. Using the elastic body as the urging member makes is possible to add an urging force to the optical coupling member 10 in a simple configuration.

In the above embodiment, the coil spring 7 provided is between the rear end face 2c of the guide member 2 and the front end face 6a of the stopper member 6, but an elastic body such as the coil spring 7 may be connected between the front end face 2b of the guide member 2 and the rear end face of the magnet 14.

However, the urging member is preferably disposed on the rear end side of the guide member 2. Since there is a wider space on the rear end side of the guide member 2 compared to the front end side, it is possible to naturally arrange the urging member. Furthermore, it is possible to obtain a state in which the magnet 14 is in contact with the front end face 2b of the guide member 2 as the initial position of the magnet 14.

Figure 21:
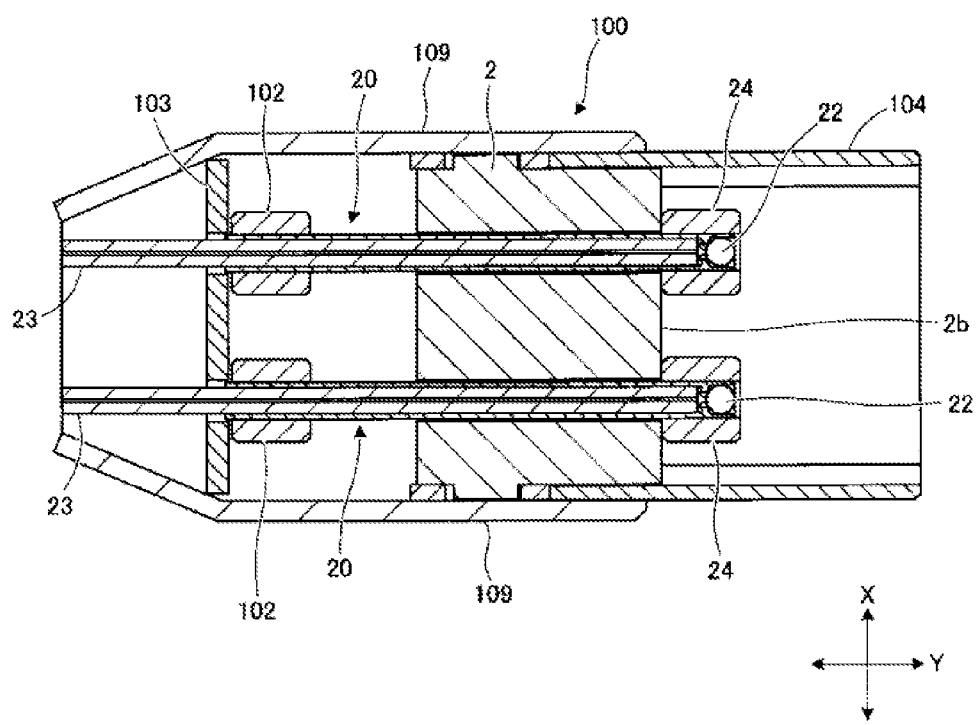
FIG. 21 is a diagram illustrating an optical connector (male type) to which an urging member different from that in FIG. 16B is applied.

In the present embodiment, instead of the configuration in which the coil spring 7 is used, an urging member which will be described below may also be used. FIG. 21 is a diagram illustrating an optical connector (male type) to which an urging member different from FIG. 16B is applied. A case will be described in FIG. 21 where the male type optical connector 100 is used, but the same is applicable to the female type optical connector 1 as well.

As shown in FIG. 21, a first attracting section 102 is provided closer to the rear end side than the guide member 2 of the optical coupling member 20 and a second attracting section 103 is provided at a position facing the first attracting section 102. The first attracting section 102 and the second attracting section 103 constitute an urging member. The second attracting section 103 is connected to the optical coupling member 20 on the rear end side of the first attracting section 102 and the second attracting section 103 is fixed to the inner wall surface of the housing 109. The second attracting section 103 is not in contact with the optical coupling member 20. In the present embodiment, the first attracting section 102 functions as a stopper member that prevents the optical coupling member 20 from protruding forward more than necessary.

In FIG. 21, an attracting force is generated between the first attracting section 102 and the second attracting section 103, and the first attracting section 102 and the second attracting section 103 are attracting each other. For example, one of the first attracting section 102 and the second attracting section 103 may be a magnet and the other may be made of a magnetic metallic material, or both may be made of a magnet. This allows the first attracting section 102 and the second attracting section 103 to attract each other by a magnetic force, and allows an urging force toward a rear end direction to be applied to the optical coupling member 20 in a simple configuration. This urging force makes it possible to obtain an initial position where the rear end face of the magnet 24 as shown in FIG. 21 comes into contact with the front end face 2b of the guide member 2. Note that as in the case where the coil spring 7 is disposed, the attracting force (urging force) generated between the first attracting section 102 and the second attracting section 103 is weaker than the magnetic force generated between the magnets 14 and 24 when the operator or the like connects the optical connectors 1 and 100. For this reason, when the operator or the like connects the optical connectors 1 and 100, the magnets 14 and 24 of the optical coupling members 10 and 20 are appropriately attracted to each other, thus allowing attraction as well as alignment, and when the operator or the like pulls the connected optical connectors 1 and 100 apart, the attracting force between the first attracting section 102 and the second attracting section 103 allows the optical coupling member 20 to be returned to its original initial position.

In the present embodiment, although the guide member 2 has been presented as a movement restricting member for the optical coupling member, the movement restricting member is not limited to the guide member 2. For example, the periphery of the holder 11 of the optical coupling member may be covered with a flexible resin layer such as elastomer and the magnet 14 may be caused to protrude on the front end side of the resin layer. The resin layer has flexibility that does not interfere with the alignment of the optical coupling member with the coupling target. Therefore, the resin layer can be made to function as a movement restricting member that allows the optical coupling member to be aligned with the coupling target but restricts the optical coupling member from moving further. This also makes it possible to improve propagation efficiency of light in the optical fiber without requiring any complicated coupling operation. However, by adopting the configuration in which the guide member having the guide groove is used as the movement restricting member and the holder of the optical coupling member is disposed in the guide groove, it is possible to accurately restrict the range of operation for aligning the optical coupling member with the coupling target, further achieve alignment of the optical coupling member in the optical connector by only arranging the holder of the optical coupling member in the guide groove of the guide member and facilitate an assembly operation of the optical coupling member.

Note that the optical connector according to the present embodiment can be used for electric connectors supporting the USB (universal serial bus) standard, electric connectors supporting the HDMI (high-definition multimedia interface) standard (HDMI is a registered trademark), electric connectors supporting the Thunderbolt standard, electric connectors supporting the Ethernet standard (Ethernet is a registered trademark), or the like. It can also be used as power supply connectors for grounding. In the case of a power supply connector, the optical coupling member for grounding is coupled with the optical coupling member of the coupling target first, and the remaining optical coupling members are then coupled. Instead of being simultaneous, coupling timing can be shifted, for example, by changing the urging force of the coil spring or the like as the urging member attached to each optical coupling member for each optical coupling member or changing the magnetic force of the magnet.

The present application is based on Japanese Patent Application No. 2014-206628 filed on Oct. 7, 2014 and Japanese Patent Application No. 2015-039122 filed on Feb. 27, 2015, entire content of which is expressly incorporated by reference herein.

The invention claimed is:

1. An optical connector, comprising:
   an optical coupling member comprising:
      a holding member, at one end of which a housing section that houses a lens is formed and at the other end of which an insertion hole for inserting an optical fiber is formed; and
      an attracting member provided to surround at least a part of an outer periphery of the holding member in a direction crossing a housing direction of the lens at the one end of the holding member, wherein the attracting member generates an attracting force for aligning a center of the lens with a center of an optical element provided in a coupling target; and
   a movement restricting member including a guide groove provided from one end to an other end which is the housing direction of the lens, and the holding member is disposed in the guide groove with the attracting member protruding from one end side of the movement restricting member, and a clearance is provided between the holding member and the guide groove, and the attracting member is allowed to perform the alignment operation on the one end side of the movement restricting member, wherein the movement restricting member restricts movement of the optical coupling member while allowing an operation of alignment of the optical coupling member with the coupling target.

2. The optical connector according to claim 1, wherein the attracting member is composed of a magnet.

3. The optical connector according to claim 2, wherein a shape of a cross section of the magnet in a direction crossing the housing direction of the lens is identical to a shape of a cross section of a magnet on a coupling target side disposed around the optical element.

4. The optical connector according to claim 3, wherein an outside shape of a cross section of the magnet in a direction crossing the housing direction of the lens is a true circle shape having the center of the lens as a central point.

5. The optical connector according to claim 1, wherein a cross section of the attracting member on a coupling target side is disposed at a same position as an end portion of the lens on the coupling target side.

6. The optical connector according to claim 1, wherein a cross section of the attracting member on a coupling target side is disposed closer to the coupling target side than an end portion of the lens on the coupling target side.

7. The optical connector according to claim 1, further comprising a guide member that guides the coupling target toward a cross section side in a direction crossing the housing direction of the lens in the attracting member.

8. The optical connector according to claim 1, further comprising a fixing member that fixes the attracting member coupled with the coupling target.

9. The optical connector according to claim 1, wherein a width and height of the guide groove are greater than a width and height of the optical coupling member of the portion disposed in the guide groove and smaller than at least one of a width and height of the optical coupling member at the position at which the attracting member is disposed.

10. The optical connector according to claim 1, wherein a plurality of optical coupling members are provided and the guide groove is provided individually for each optical coupling member.

11. The optical connector according to claim 1, further comprising an urging member that urges the attracting member toward one end face side of the movement restricting member, wherein an urging force of the urging member is weaker than the attracting force with respect to the coupling target in the attracting member.

12. The optical connector according to claim 11, wherein the urging member is an elastic body that connects the movement restricting member and the optical coupling member, and the attracting member is urged toward the one end face side of the movement restricting member by an elastic force of the elastic body.

13. The optical connector according to claim 12, wherein the elastic body connects the movement restricting member and the optical coupling member on the other end side facing the movement restricting member.

14. The optical connector according to claim 11, wherein:
the urging member comprises a first attracting section provided in the optical coupling member on the other end side of the movement restricting member and a second attracting section that faces the first attracting section and is fixed on a housing side, and
the attracting member is urged toward the one end face side of the movement restricting member by an attraction between the first attracting section and the second attracting section.

15. An electric connector comprising:
the optical connector according to claim 1; and
a contact terminal for transmitting an electric signal.

* * * * *